United States Patent
Batzer

(10) Patent No.: US 12,206,485 B2
(45) Date of Patent: Jan. 21, 2025

(54) WIDEBAND BEAMFORMING WITH MAIN LOBE STEERING AND INTERFERENCE CANCELLATION AT MULTIPLE INDEPENDENT FREQUENCIES AND SPATIAL LOCATIONS

(71) Applicant: ClearOne, Inc., Salt Lake City, UT (US)

(72) Inventor: Trisha Batzer, North Salt Lake, UT (US)

(73) Assignee: ClearOne, Inc., Salt Lake City, UT (US)

( * ) Notice: Subject to any disclaimer, the term of this patent is extended or adjusted under 35 U.S.C. 154(b) by 0 days.

(21) Appl. No.: 18/003,313

(22) PCT Filed: Apr. 14, 2022

(86) PCT No.: PCT/IB2022/053551
§ 371 (c)(1),
(2) Date: Apr. 27, 2023

(87) PCT Pub. No.: WO2022/219594
PCT Pub. Date: Oct. 20, 2022

(65) Prior Publication Data
US 2023/0268977 A1 Aug. 24, 2023

Related U.S. Application Data

(60) Provisional application No. 63/174,884, filed on Apr. 14, 2021.

(51) Int. Cl.
*H04S 7/00* (2006.01)
*H04B 1/10* (2006.01)
(Continued)

(52) U.S. Cl.
CPC ........... *H04B 7/086* (2013.01); *H04B 1/1027* (2013.01)

(58) Field of Classification Search
CPC ........ H04B 7/086; H04B 7/08; H04B 7/0417; H04B 7/0413; H04B 1/1027; H04B 1/10;
(Continued)

(56) References Cited

U.S. PATENT DOCUMENTS 9,226,088 B2 12/2015 Pandey et al.
9,264,553 B2 2/2016 Pandey et al.
(Continued)

FOREIGN PATENT DOCUMENTS

WO 0016308 A1 3/2000
WO 2022219594 A1 10/2022

*Primary Examiner* — Leshui Zhang
(74) *Attorney, Agent, or Firm* — Matthew J Booth PC; Matthew J. Booth

(57) ABSTRACT

This disclosure describes a wide band array that uses wideband beamforming with interference cancellation at multiple independent frequencies and spatial locations and main lobe steering at multiple independent frequencies and spatial locations. One embodiment uses one through N analysis filter bands 1410 coupled to one through N narrowband beamformers 1414 with the output processed through one through N synthesis bands and summed together to produce the full spectrum output signal 1426. Another embodiment uses one through M sensors with Discrete Fourier Transforms (DFT) and one through N frequency bins 1412 coupled to one through N narrowband beamformers 1414 processed through an Inverse DFT to produce the full spectrum output signal 1428. Another embodiment uses one through N sensor subarrays and one through N frequency bands 1406 coupled to one through N narrowband beamformers 1414 summed together to produce the full spectrum output signal 1422. Another embodiment uses one through M sensor arrays with one through N frequency bands 1408
(Continued)

coupled to one through N narrowband beamformers 1414 summed together to produce the full spectrum output signal 1424.

5 Claims, 18 Drawing Sheets

(51) Int. Cl.
  *H04B 7/08* (2006.01)
  *H04R 3/04* (2006.01)
  *H04R 5/027* (2006.01)
  *H04R 29/00* (2006.01)
  *H04S 3/00* (2006.01)

(58) Field of Classification Search
  CPC .......... H04R 3/005; H04R 3/00; H04R 1/406; H04R 25/407; H01Q 3/2605; H01Q 3/2611; H01Q 1/246; G01S 15/876; G01S 15/89; G01S 7/2813; G01S 19/21; G01S 13/426; G01S 3/74; G01S 7/52085; G10L 21/0216
  USPC ....... 381/91, 92, 94.2, 94.3, 97, 98, 99, 100, 381/101, 102, 103, 110, 112, 113, 114, 381/115, 122; 700/94
  See application file for complete search history.

(56) References Cited

U.S. PATENT DOCUMENTS

| | | | |
|---|---|---|---|
| 9,635,186 | B2 | 4/2017 | Pandey et al. |
| 9,641,688 | B2 | 5/2017 | Pandey et al. |
| 9,854,101 | B2 | 12/2017 | Pandey et al. |
| 10,728,653 | B2 | 7/2020 | Graham et al. |
| 11,272,064 | B2 | 3/2022 | Pandey et al. |
| 11,539,846 | B1 | 12/2022 | Pandey et al. |
| 11,831,812 | B2 | 11/2023 | Pandey et al. |
| 2004/0175006 | A1* | 9/2004 | Kim ...................... H04R 3/005 381/92 |
| 2008/0068266 | A1 | 3/2008 | DeAgro |
| 2010/0322437 | A1* | 12/2010 | Matsuo ............... G10L 21/0208 381/94.2 |
| 2013/0101073 | A1 | 4/2013 | Zai et al. |
| 2015/0092890 | A1 | 4/2015 | Richards |
| 2016/0013855 | A1 | 1/2016 | Campos et al. |
| 2021/0377653 | A1 | 12/2021 | Grinnip, III et al. |
| 2024/0022668 | A1 | 1/2024 | Pandey et al. |

* cited by examiner

WIDEBAND BEAMFORMING WITH MAIN LOBE STEERING AND INTERFERENCE CANCELLATION AT MULTIPLE INDEPENDENT FREQUENCIES AND SPATIAL LOCATIONS

CROSS REFERENCE TO RELATED APPLICATIONS

This application claims priority and the benefits of the earlier filed Provisional Application U.S. AN 63/174,884, filed Apr. 14, 2021, which is incorporated by reference for all purposes into this specification.

And this application is a 371 National Stage Application and claims priority and the benefits of the earlier filed International Application Ser. No. PCT/IB2022/053551, filed Apr. 14, 2022, which is incorporated by reference for all purposes into this specification.

TECHNICAL FIELD

This disclosure relates to wideband beamforming. More specifically, this disclosure relates to wideband beamforming with interference cancellation at multiple independent frequencies and spatial locations.

BACKGROUND ART

A beamformer filters in space and frequency. Beamforming generates a filter that focuses on one spatial area and attenuates regions outside that focus, across the signal frequencies of interest. Beamforming can be realized in the time-domain or frequency domain. Although there are many methods to implement each domain, this disclosure applies to either domain. Specifically, this disclosure applies when a wideband spectrum is decomposed into smaller frequency bands or frequency bins such that the beamforming in the subset can be independently controlled.

A beamforming array comprises a plurality of sensors, that receive incoming signals at the sensors. Signals include any time varying voltage, current, or electromagnetic wave that carries information and includes acoustic signals, radio signals, electromagnetic signals or similar signals. A sensor is a device designed to receive the signal of interest, such as microphones, antennae, probes, or other suitable electronic circuits for the frequency range of interest. The incoming signal at each sensor can be weighted, phase shifted, or filtered and then summed to form a collective radiation or directivity pattern which is called beamforming. Beamforming arrays of sensor elements must be designed to the frequency range of the arriving signals.

FIG. 1 illustrates that the geometry of the array can be any physically realizable arrangement such as linear or 1D, planar to 2D, and 3D shapes such as spheres, ellipsoids, or cylinders. Geometries include:

1D—straight lines of arrays called linear arrays where the spacing between sensors may be uniform or non-uniform. See for example FIG. 7 with 700 and example arrays 702, 704, 706, 708.

2D—rectangular arrays comprising rows of linear arrays 100; a triangle in a plane 104; linear arrays perpendicular to one another 106; linear arrays sharing a common center forming lines around a circle (not shown); a hexagon (not shown); circular planar (not shown); circular concentric rings of varying diameters 102; concentric ellipse(s) of varying axes dimensions (not shown); hexagons within hexagons that increase in size (not shown); squares or rectangles within squares or rectangles that increase in size (not shown); triangles within triangles that increase in size (not shown); sparse arrays (not shown); random arrays (not shown); spirals (not shown); wheel arrays (not shown).

3D—spherical arrays comprising circles with varying diameter 110; ellipsoidal arrays again with varying sizes of an ellipse (not shown); cylindrical arrays 108; conformal arrays (not shown); and 2D arrays tilted at different angles over a 3D surface (not shown).

FIG. 2 illustrates a beam 200 in 3D space at one frequency and shows the grayscale gain of normalized power in dB. A beam in space has a gain response called a beam pattern or directivity pattern which defines the region of focus and attenuation. The main lobe is the focus area of highest gain, and the minor lobes are lower gain. The main lobe is within the first null-to-null. Side lobes are minor lobes that flank the main lobe. Phrases referring to minor lobes and side lobes may be used interchangeably.

Narrowband beamforming, as it's called, supports only narrow frequency regions or often just one frequency. Wideband, or broadband, beamforming covers a large frequency spectrum or many narrowband frequency components. Using narrowband or wideband depends on the frequency content of the signal of interest.

Beams can be steered in space to specific locations to obviously boost the signal in the desired location and reject other locations as desired. The steering angles are denoted azimuth and elevation. For 1 D arrays, maneuvering a beam is only in one dimension and there is a symmetric beam image. For 2D arrays, steering is in azimuth and elevation or two dimensions, and it has an image on either side of the plane. Back baffling of sensors may be used to reduce one image. For 3D, the beam steered in azimuth and elevation is unique and has no mirror image.

Patent Literature of Related Patents

PLT1: U.S. Pat. No. 9,635,186. Title: "A Conferencing Apparatus that Combines a Beamforming Microphone Array with an Acoustic Echo Canceller". This patent discloses a conferencing apparatus that combines a beamforming microphone array (BMA) with an acoustic echo canceller where the BMA further comprises a plurality of microphones that are oriented to develop a corresponding plurality of microphone signals. The apparatus further includes a processor, memory, and storage where the processor is configured to execute program instructions. The processor performs a beamforming operation to create a plurality of combined signals. In addition, the processor performs an acoustic echo cancellation operation to generate a plurality of combined echo cancelled signals. Further, the processor selects one of the combined echo cancelled signals for transmission to the far end where the signal selection module uses the far end signal as information to inhibit the signal selection module from changing the selection of the combined echo cancelled signals while only the far end signal is active. This reference is incorporated by reference for all purposes into this disclosure. This patent can use the teachings of this disclosure in its beamforming.

PLT2: U.S. Pat. No. 10,728,653. Title: Ceiling Tile Microphone. This patent describes an apparatus and method of an embodiment of an invention that is a ceiling tile microphone. This embodiment of the apparatus includes: a beamforming microphone array that includes beamforming and acoustic echo cancellation, the plurality of microphones of the beamforming microphone array are positioned at predetermined locations, the beamforming microphone array picks up audio input signals; a ceiling tile combined with the beamforming microphone array, the ceiling tile being sized and shaped to be mountable in a drop ceiling in place of at least one of a plurality of ceiling tiles included in the drop ceiling; where the outer surface of the ceiling tile is acoustically transparent. This reference is incorporated by reference for all purposes into this disclosure. This patent can use the teachings of this disclosure in its beamforming.

Technical Problem

Currently wideband arrays cannot place lobes or nulls at multiple independent frequencies in space. In addition, no one has combined both frequency and space interference cancellation and pointing for unique combinations of interference cancellation over the entire wideband in one wideband array.

Solution to Problem

This disclosure describes multiple embodiments that provide a wideband array to effectively position nulls in space at selected frequencies so as to combine both frequency and space interference cancellation, providing unique combinations of interference cancellation over the entire wideband in one wideband array.

Advantageous Effects of Invention

Combining both frequency and space interference cancellation and pointing, for unique combinations of interference cancellation over the entire wideband in one wideband array is unique in the arts. Currently, wideband arrays do not place lobes or nulls at multiple independent frequencies in space. This disclosure describes how to create that capability for wideband arrays. In addition, this disclosure provides a capability for multiple null locations at multiple frequencies across a wideband, and dynamic re-positioning of such nulls.

SUMMARY OF INVENTION

This disclosure describes apparatuses and methods directed to a wide band array that uses wideband beamforming with interference cancellation at multiple independent frequencies and spatial locations and main lobe steering at multiple independent frequencies and spatial locations. One embodiment uses one through N analysis filter bands coupled to one through N narrowband beamformers with the output processed through one through N synthesis bands and summed together to produce the full spectrum output signal. Another embodiment uses one through M sensors with Discrete Fourier Transforms (DFT) and one through N frequency bins coupled to one through N narrowband beamformers processed through an Inverse DFT to produce the full spectrum output signal. Another embodiment uses one through N sensor subarrays and one through N frequency bands coupled to one through N narrowband beamformers summed together to produce the full spectrum output signal, where a subarray is a subset of sensors with intersensory spacing designed to support a frequency band. Another embodiment uses one through M sensor arrays with one through N frequency bands coupled to one through N narrowband beamformers summed together to produce the full spectrum output signal.

This disclosure describes an apparatus and method of an embodiment of the disclosure that is a wide band array that uses wideband beamforming with main lobe steering and interference cancellation at multiple independent frequencies and spatial locations, including: a first frequency band that comprises of one or more sensors where each sensor is configured to sense signals, a first analysis filter bandpasses signals from the sensors in a first frequency band, the processed signals may or may not be decimated, the processed signals are further processed by a first narrowband beamformer dedicated to the first frequency band, the narrowband beamformer generates a steerable main lobe and at least one null region placed at spatial locations in the first frequency band, the processed and beamformed signals are further processed by interpolation to accompany decimation, and are further processed by a first synthesis filter; a second frequency band that comprises of one or more sensors where each sensor is configured to sense signals, a second analysis filter bandpasses signals in a second frequency band, the processed signals may or may not be decimated, the processed signals are further processed by a second narrowband beamformer dedicated to the second frequency band, the narrowband beamformer generates a steerable main lobe and at least one null region placed at spatial locations in the second frequency band, the processed and beamformed signals are further processed by interpolation to accompany decimation, and are further processed by a second synthesis filter; an $N_{th}$ frequency band that comprises of one or more sensors where each sensor is configured to sense signals, an $N_{th}$ analysis filter bandpasses signals in an $N_{th}$ frequency band, the processed signals may or may not be decimated, the processed signals are further processed by an $N_{th}$ narrowband beamformer dedicated to the $N_{th}$ frequency band, the narrowband beamformer generates a steerable main lobe and at least one null region placed at spatial locations in the $N_{th}$ frequency band, the processed and beamformed signals are further processed by interpolation to accompany decimation, and are further processed by an $N_{th}$ synthesis filter; and the signal output from each of the first synthesis filter, the second synthesis filter, and the $N_{th}$ synthesis filter are summed together to produce the full spectrum output signal.

This disclosure further describes an apparatus and method of an embodiment of the disclosure that is a wide band array that uses wideband beamforming with main lobe steering and interference cancellation at multiple independent frequencies and spatial locations, including: a first sensor is configured to sense and time-sample signals at the Nyquist sampling rate into a first buffer, a first Discrete Fourier Transform (DFT) decomposes the signals from the first buffer into a first frequency bin, a second frequency bin, and an $N_{th}$ frequency bin of the first DFT; a second sensor is configured to sense and time-sample signals at the Nyquist sampling rate into a second buffer, a second DFT decomposes the signals from the second buffer into a first frequency bin, a second frequency bin, and an $N_{th}$ frequency bin of the second DFT; an $M_{th}$ sensor is configured to sense and time-sample signals at the Nyquist sampling rate into an $M_{th}$ buffer, an $M_{th}$ DFT decomposes the signals from the $M_{th}$ buffer into a first frequency bin, a second frequency bin, and an $N_{th}$ frequency bin of the $M_{th}$ DFT; a first narrowband beamformer that processes the decomposed signals of the first frequency bin from the first DFT, the second DFT, and the $M_{th}$ DFT, the first narrowband beamformer generates a steerable main lobe and at least one null region steerable in spatial locations in the first frequency bin; a second narrowband beamformer that processes the decomposed signals of the second frequency bin from the first DFT, the second DFT, and the $M_{th}$ DFT, the second narrowband beamformer generates a steerable main lobe and at least one null region placed at spatial locations in the second frequency bin; an $N_{th}$ narrowband beamformer that processes the decomposed signals of the $N_{th}$ frequency bin from the first DFT, the second DFT, and the $M_{th}$ DFT, the $N_{th}$ narrowband beamformer generates a steerable main lobe and at least one null region placed at spatial locations in the $N_{th}$ frequency bin; the signal output from each of the first beamformer, the second beamformer, and the $N_{th}$ beamformer are processed through an Inverse Discrete Fourier Transform (IDFT) to produce the full spectrum output signal.

This disclosure further describes an apparatus and method of an embodiment of the disclosure that is a wide band array that uses wideband beamforming with interference cancellation at multiple independent frequencies and spatial locations, including: a first $M_1$ set of sensors forms the first subarray and is physically configured to sense signals for a first frequency band $[f_1, f_2]$ by upholding the spatial Nyquist sampling distances between sensors, a first filter bandpasses signals in the first frequency band from the first subarray; a second $M_2$ set of sensors forms the second subarray and is physically configured to sense signals for a second frequency band $[f_2, f_3]$ by upholding the spatial Nyquist sampling distances between sensors, a second filter bandpasses signals in the second frequency band from the second subarray; an $M_n^{th}$ set of sensors forms the $N_{th}$ subarray and is physically configured to sense signals for an $N_{th}$ frequency band $[f_N, f_{edge}]$ by upholding the spatial Nyquist sampling distances between sensors, an $N_{th}$ filter bandpasses signals in the $N_{th}$ frequency band from the $N_{th}$ subarray; a first beamformer that processes the signals of the first frequency band, the first beamformer generates a steerable main lobe and at least one null region placed at spatial locations in the first frequency band; a second beamformer that processes the signals of the second frequency band, the second beamformer generates a steerable main lobe and at least one null region placed at spatial locations in the second frequency band; an $N_{th}$ beamformer that processes the signals of the $N_{th}$ frequency band, the $N_{th}$ beamformer generates a steerable main lobe and at least one null region placed at spatial locations in the $N_{th}$ frequency band; the signal output from each of the first subarray, the second subarray, and the $N_{th}$ subarray are summed to produce the full spectrum output signal.

This disclosure further describes an apparatus and method of an embodiment of the disclosure that is a wide band array that uses wideband beamforming with main lobe steering and interference cancellation at multiple independent frequencies and spatial locations, including: a first frequency band that comprises one or more sensors where each sensor is configured to sense signals, the first bandpass filter passes signals from the sensors in a first frequency band, the processed signals are further processed by a first narrowband beamformer dedicated to the first frequency band, the narrowband beamformer generates a steerable main lobe and at least one null region placed at spatial locations in the first frequency band; a second frequency band that comprises one or more sensors where each sensor is configured to sense signals, the second bandpass filter passes signals in a second frequency band, the processed signals are further processed by a second narrowband beamformer dedicated to the second frequency band, the narrowband beamformer generates a steerable main lobe and at least one null region placed at spatial locations in the second frequency band; an $N_{th}$ frequency band that comprises one or more sensors where each sensor is configured to sense signals, the $N_{th}$ bandpass filter passes signals in an $N_{th}$ frequency band, the processed signals are further processed by an $N_{th}$ narrowband beamformer dedicated to the $N_{th}$ frequency band, the narrowband beamformer generates a steerable main lobe and at least one null region placed at spatial locations in the first frequency band; and the signal output from each of the first narrowband beamformer, the second narrowband beamformer, and the $N_{th}$ narrowband beamformer are summed together to produce the full spectrum output signal.

The present disclosure further describes an apparatus and method of an embodiment of the invention as further described in this disclosure. Other and further aspects and features of the disclosure will be evident from reading the following detailed description of the embodiments, which should illustrate, not limit, the present disclosure.

BRIEF DESCRIPTION OF DRAWINGS

The drawings accompanying and forming part of this specification are included to depict certain aspects of the disclosure. A clearer impression of the disclosure, and of the components and operation of systems provided with the disclosure, will become more readily apparent by referring to the exemplary, and therefore non-limiting, embodiments illustrated in the drawings, where identical reference numerals designate the same components. Note that the features illustrated in the drawings are not necessarily drawn to scale. The following is a brief description of the accompanying drawings.

DESCRIPTION OF EMBODIMENTS

Figure 1:
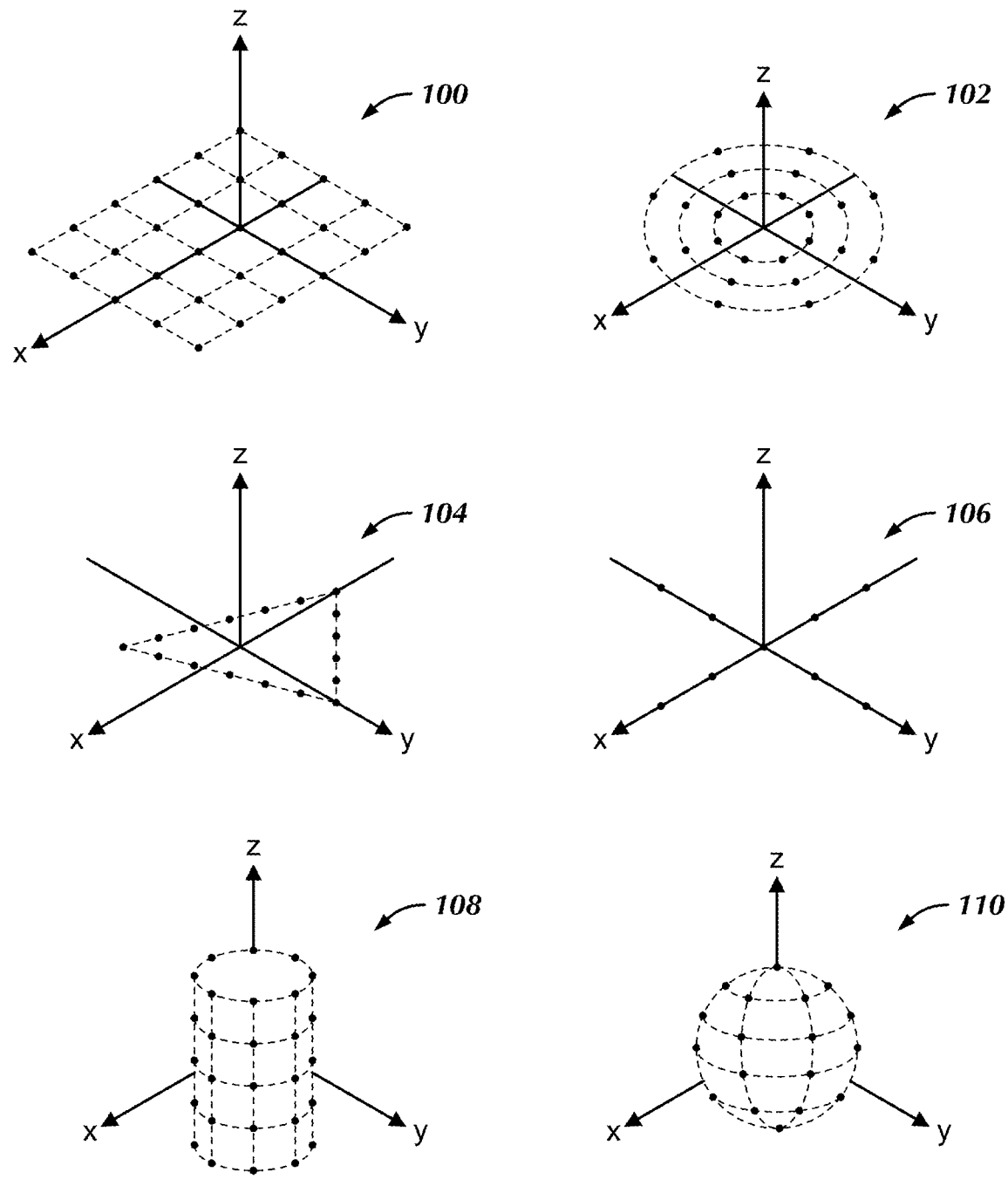
FIG. 1 illustrates examples of array geometries.
Figure 2:
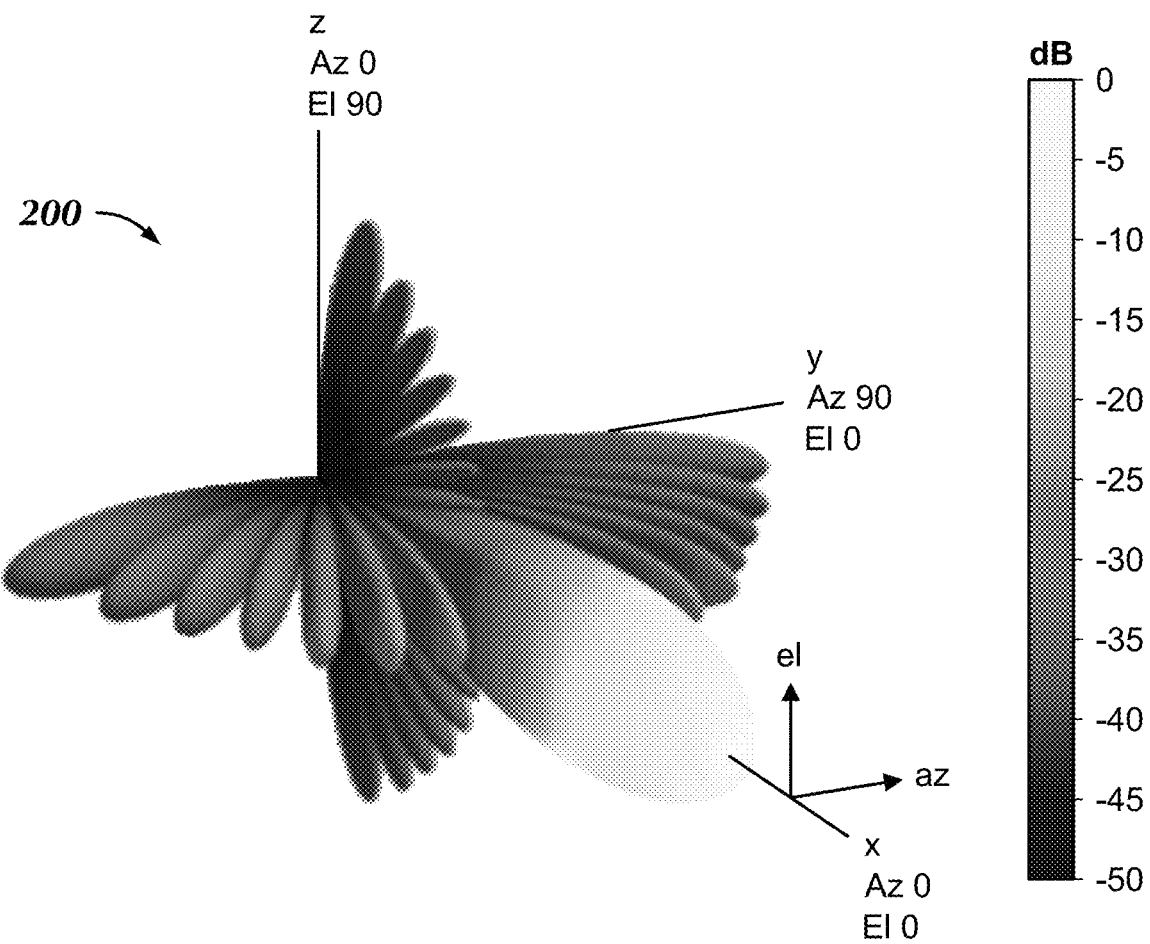
FIG. 2 illustrates a beam in 3D space at one frequency and shows the gray shaded gain of normalized power in dB.

The disclosed embodiments should describe aspects of the disclosure in sufficient detail to enable a person of ordinary skill in the art to practice the invention. Other embodiments may be utilized, and changes may be made without departing from the disclosure. The following detailed description is not to be taken in a limiting sense, and the present invention is defined only by the included claims.

Specific implementations shown and described are only examples and should not be construed as the only way to implement or partition the present disclosure into functional elements unless specified otherwise in this disclosure. A person of ordinary skill in the art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Benefits, other advantages, and solutions to problems are shown and described with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In the following description, elements, circuits, functions, and devices may be shown in block diagram form in order not to obscure the present disclosure in unnecessary detail. And block definitions and partitioning of logic between various blocks are exemplary of a specific implementation. It will be readily apparent to a person of ordinary skill in the art that the present disclosure may be practiced by numerous other partitioning solutions. A person of ordinary skill in the art would understand that information and signals may be represented using any of a variety of technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, where the bus may have a variety of bit widths and the present disclosure may be implemented on any number of data signals including a single data signal.

The illustrative functional units include logical blocks, modules, circuits, and devices described in the embodiments disclosed in this disclosure to emphasize their implementation independence more particularly. The functional units may be implemented or performed with a general-purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described in this disclosure. A general-purpose processor may be a microprocessor, any conventional processor, controller, microcontroller, or state machine. A general-purpose processor may be considered a special purpose processor while the general-purpose processor is configured to fetch and execute instructions (e.g., software code) stored on a computer-readable medium such as any type of memory, storage, and/or storage devices. A processor may also be implemented as a combination of computing devices, such as a combination of a DSP and a microprocessor, a plurality of microprocessors, one or more microprocessors in conjunction with a DSP core, or any other such configuration.

In addition, the illustrative functional units described above may include software, programs, or algorithms such as computer readable instructions that may be described in terms of a process that may be depicted as a flowchart, a flow diagram, a structure diagram, or a block diagram. The process may describe operational acts as a sequential process, many acts can be performed in another sequence, in parallel, or substantially concurrently. Further, the order of the acts may be rearranged. In addition, the software may comprise one or more objects, agents, threads, lines of code, subroutines, separate software applications, two or more lines of code or other suitable software structures operating in one or more software applications or on one or more processors. The software may be distributed over several code segments, modules, among different programs, and across several memory devices. Similarly, operational data may be identified and illustrated in this disclosure within modules and may be embodied in any suitable form and organized within any suitable data structure. The operational data may be collected as a single data set or may be distributed over different locations including over different storage devices. Data stated in ranges include each and every value within that range.

Elements described in this disclosure may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most discussed. For example, where feasible elements in Drawing 1 are designated with a format of 1xx, where 1 indicates Drawing 1 and xx designates the unique element.

Any reference to an element in this disclosure using a designation such as "first," "second," and so forth does not limit the quantity or order of those elements, unless such limitation is explicitly stated. Rather, these designations may be used in this disclosure as a convenient method of distinguishing between two or more elements or instances of an element. A reference to a first and second element does not mean that only two elements may be employed or that the first element must precede the second element. In addition, unless stated otherwise, a set of elements may comprise one or more elements.

Reference throughout this specification to "one embodiment", "an embodiment" or similar language means that a particular feature, structure, or characteristic described in the embodiment is included in at least one embodiment of the present invention. Appearances of the phrases "one embodiment", "an embodiment" and similar language throughout this specification may, but do not necessarily, all refer to the same embodiment.

In the following detailed description, reference is made to the illustrations, which form a part of the present disclosure, and in which is shown, by way of illustration, specific embodiments in which the present disclosure may be practiced. These embodiments are described in sufficient detail to enable a person of ordinary skill in the art to practice the present disclosure. However, other embodiments may be utilized, and structural, logical, and electrical changes may be made without departing from the true scope of the present disclosure. The illustrations in this disclosure are not meant to be actual views of any particular device or system but are merely idealized representations employed to describe embodiments of the present disclosure. And the illustrations presented are not necessarily drawn to scale. And elements common between drawings may retain the same or have similar numerical designations.

It will also be appreciated that one or more of the elements depicted in the drawings or figures can also be implemented in a more separated or integrated manner, or even removed or rendered as inoperable in certain cases, as is useful in accordance with a particular application. Additionally, any signal arrows in the drawings or figures should be considered only as exemplary, and not limiting, unless otherwise specifically noted. The scope of the present disclosure should be determined by the following claims and their legal equivalents.

As used in this disclosure, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Furthermore, the term "or" as used in this disclosure is generally intended to mean "and/or" unless otherwise indicated. For example, a condition A or B is satisfied by any one of the following: A is true (or present) and B is false (or not present); A is false (or not present) and B is true (or present); and both A and B are true (or present). As used in this disclosure, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description in this disclosure, the meaning of "in" includes "in" and "on" unless the context clearly dictates otherwise.

To aid any Patent Office and any readers of any patent issued on this disclosure in interpreting the included claims, the Applicant(s) wish to note that they do not intend any of the appended claims or claim elements to invoke 35 U.S.C. 112(f) (previously 35 U.S.C. 112(6)) unless the words "means for" or "step for" are explicitly used in that claim. Additionally, if any elements are specifically recited in means-plus-function format, then those elements are intended to be construed to cover the corresponding structure, material, or acts described in this disclosure or additional equivalents in accordance with 35 U.S.C. 112(f) (previously 35 U.S.C. 112(6)).

This disclosure describes multiple embodiments that allow a wideband array that uses wideband beamforming with main lobe steering and null placement to effectively position nulls in space at selected frequencies to combine both frequency and space interference cancellation, which provides unique combinations of interference cancellation over the entire wideband in one wideband array. Combining both frequency and space interference cancellation and pointing, for unique combinations of interference cancellation over the entire wideband in one wideband array is unique in the arts. Currently, wideband arrays do not place lobes or nulls at multiple independent frequencies in space. This disclosure describes how to create that capability for wideband arrays. In addition, this disclosure provides a capability for multiple null locations at multiple frequencies across a wideband, and dynamic re-positioning of such nulls.

Figure 4:
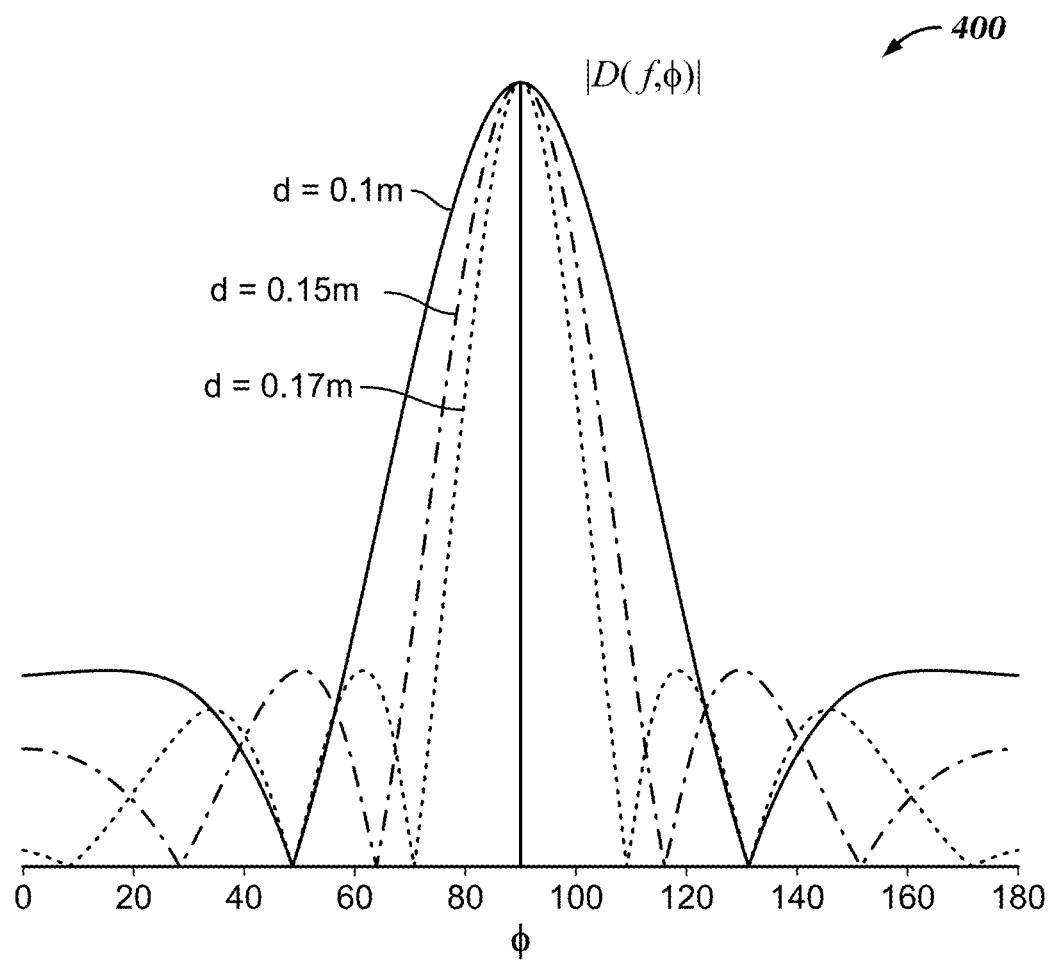
FIG. 4 illustrates the directivity Pattern for varying element spacing with M=5 sensors and f=1 KHz.

FIG. 4 illustrates the directivity Pattern 400 in degrees for varying element spacing with M=5 sensors and f=1 KHz and demonstrates the two-dimensional directivity pattern for different element spacings at a given frequency and fixed number of sensors. Array sensor spacing must be such that the distance between sensors is less than or equal to $\lambda/2$ for Nyquist spatial sampling, where $\lambda=c/f$ and c is the propagation speed of the signal and f is the frequency of the incoming signal.

Subarrays are subsets of sensors within the total array and can be scaled specifically for a narrower frequency band within the wideband. In other words, the spacing between sensors is designed for the subarray's frequency band, specifically the interelement spacing $d \leq \lambda min/2$ and $\lambda min$ is the minimum wavelength in the subarray's frequency band. The spacing of sensors are designed to achieve a given beam width and beam pattern, and the number of sensors also contribute to the beam pattern. The weights of the sensors also change the inherent beam pattern achieved with weighting of ones. Specifically, standard window functions, also called weighting or taper, assign non-one weights to the sensors to modify the main lobe beam width and increase sidelobe depth.

Figure 7:
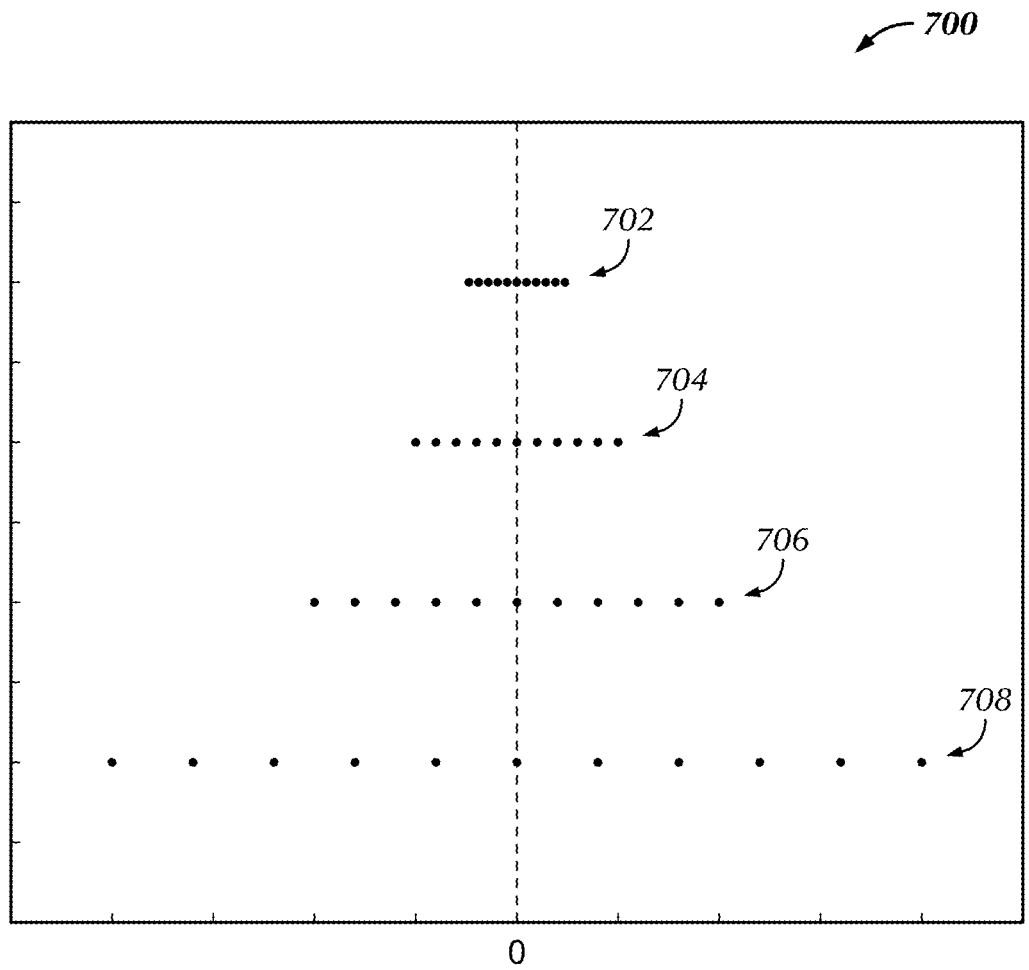
FIG. 7 illustrates array beamforming using linear subarrays.

FIG. 7 illustrates array beamforming using a wideband array with a group of linear subarrays 700 that has linear subarrays 702, 704, 706, 708 that feature the same number of sensors per band and contiguous frequency bands. There are 11 elements or sensors per subarray with 0 denoting the middle of the element subarray. Spacing between adjacent sensors is denoted as a function of a constant 'd.' Row 702 has spacing d, row 704 has spacing 2d, row 706 has spacing 4d, and the row 708 has spacing 8d, all of which agree with each subarray's frequency band. The frequency bands would correspond to $[f_{high}/2\ f_{high}]$ for the tightest subarray (702), the next frequency band subarray 704 would be $[f_{high}/4\ f_{high}/2]$ since the spacing is 2d, the third subarray 706 becomes $[f_{high}/8\ f_{high}/4]$ since the spacing is 2 times the previous, and the fourth subarray 708 becomes $[f_{high}/16\ f_{high}/8]$. Sensors can be shared between subarrays according to spacing if efficiency is a goal but is not necessary for this disclosure.

Figure 8:
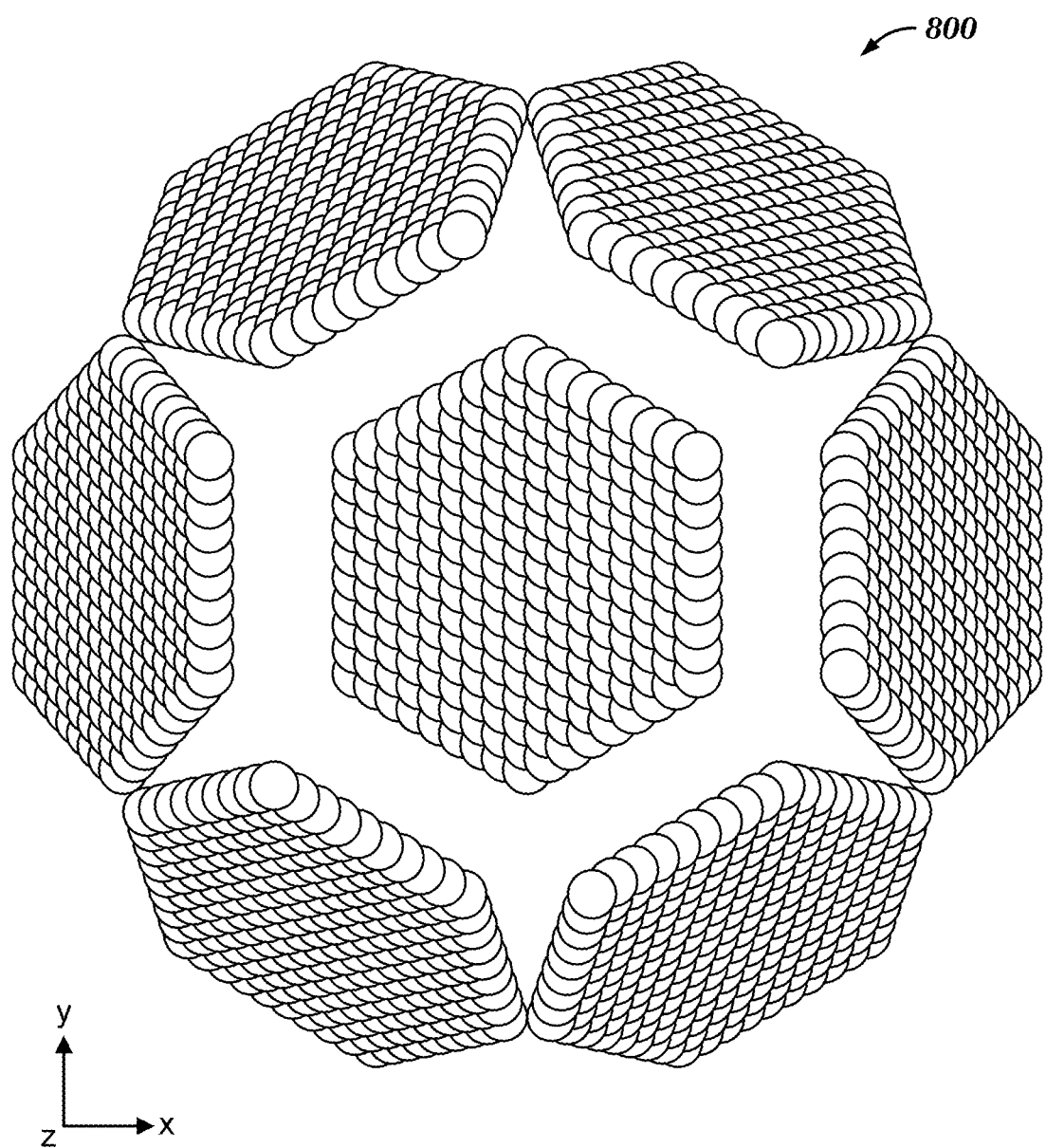
FIG. 8 illustrates array beamforming using hexagonal subarrays.

FIG. 8 illustrates array beamforming 800 using hexagonal subarrays that shows a cluster of hexagons over a sphere. This subarray geometry can be designed according to the frequency band, desired directivity pattern, and desired steering angles.

Figure 9:
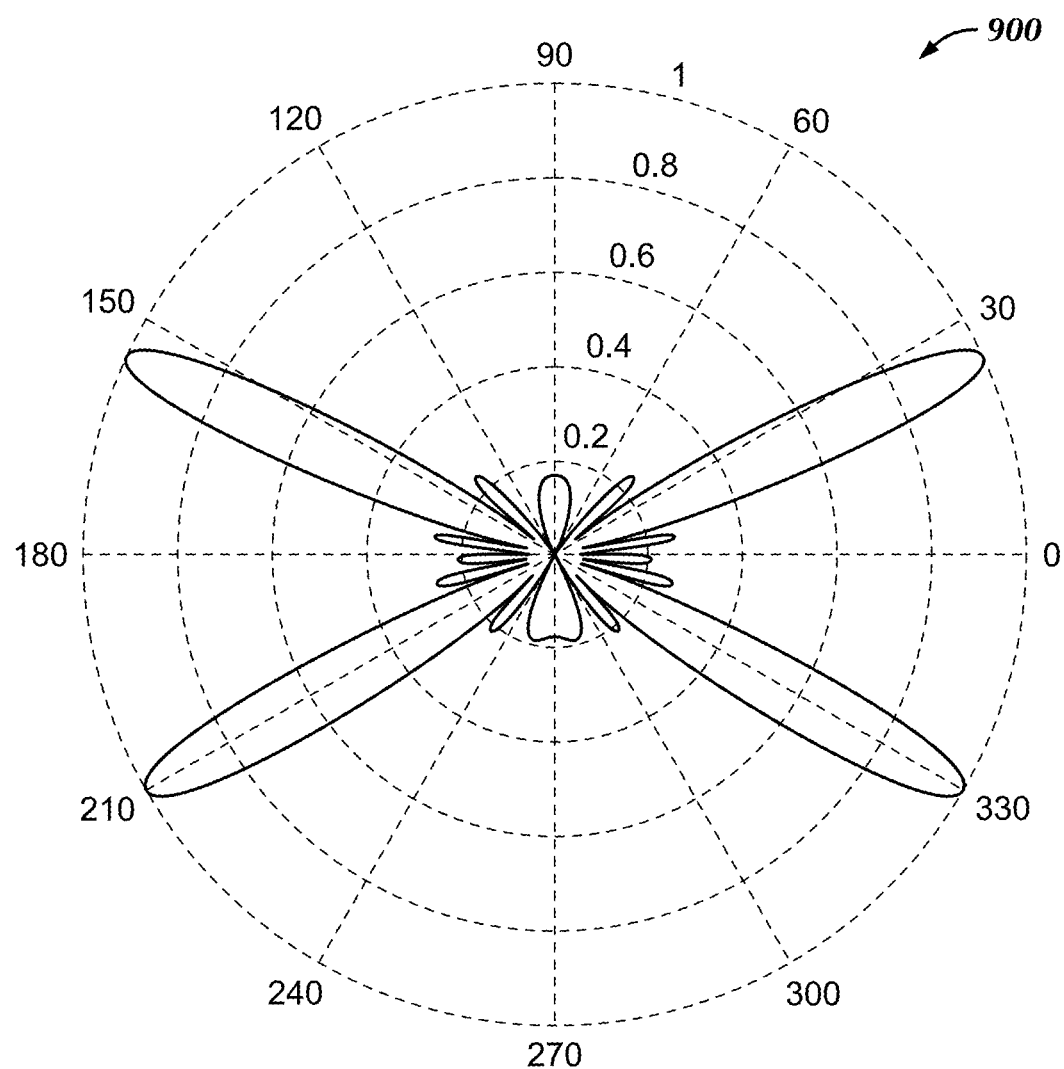
FIG. 9 illustrates main lobes steered to 25 degrees and −30 degrees and nulls placement at +60 degrees and −60 degrees.

FIG. 9 illustrates 900 an example of main lobes steered to 25 degrees and −30 degrees and nulls placement at +60 degrees and −60 degrees according to an embodiment of this disclosure. Besides steering a main lobe, nulls may mathematically be inserted at specific locations. Nulls are characteristics in a beam pattern that exhibit deep attenuation. Some applications require a beam pattern to exhibit nulls at a given direction or location. Nulls can be specified as a point or discrete stacked points that form a broader null region. The beamforming algorithm synthesizes nulls using null constraints for sensor weights, least squares fit, eigen filters, or frequency domain processing, but is not restricted to those. One skilled in the art will appreciate the design of the beamforming algorithm will vary according to the specific performance requirements and can be preset or chosen by a user for the intended application and frequency response before running or using the embodiment.

Figure 10:
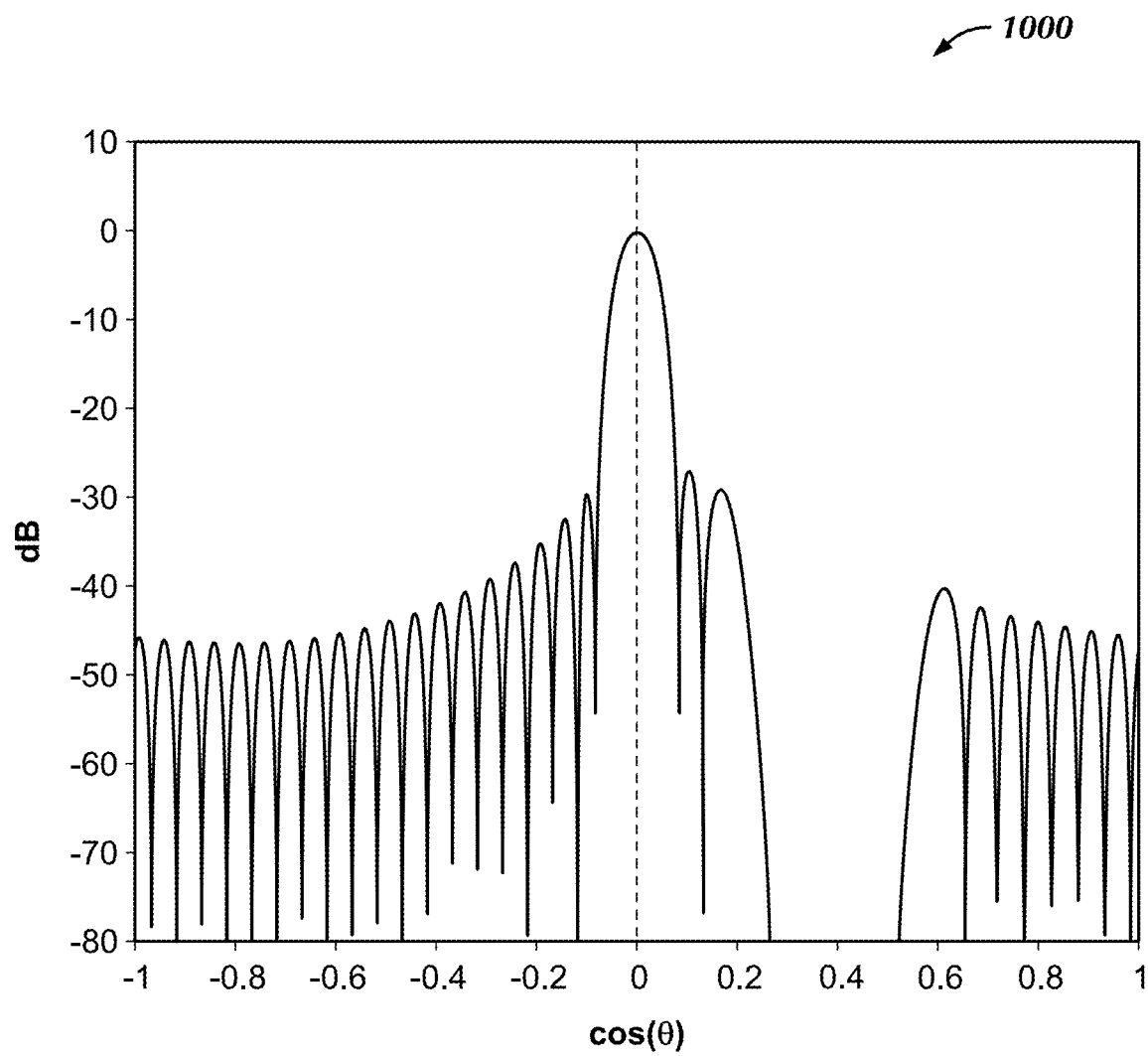
FIG. 10 illustrates a null region for interference rejection with nulls stacked for a broader area of rejection.

FIG. 10 illustrates a null region 1000 for interference rejection with nulls stacked for a broader area of rejection according to an embodiment of this disclosure.

The Null region is centered around +0.4 on the X-axis.

Figure 11:
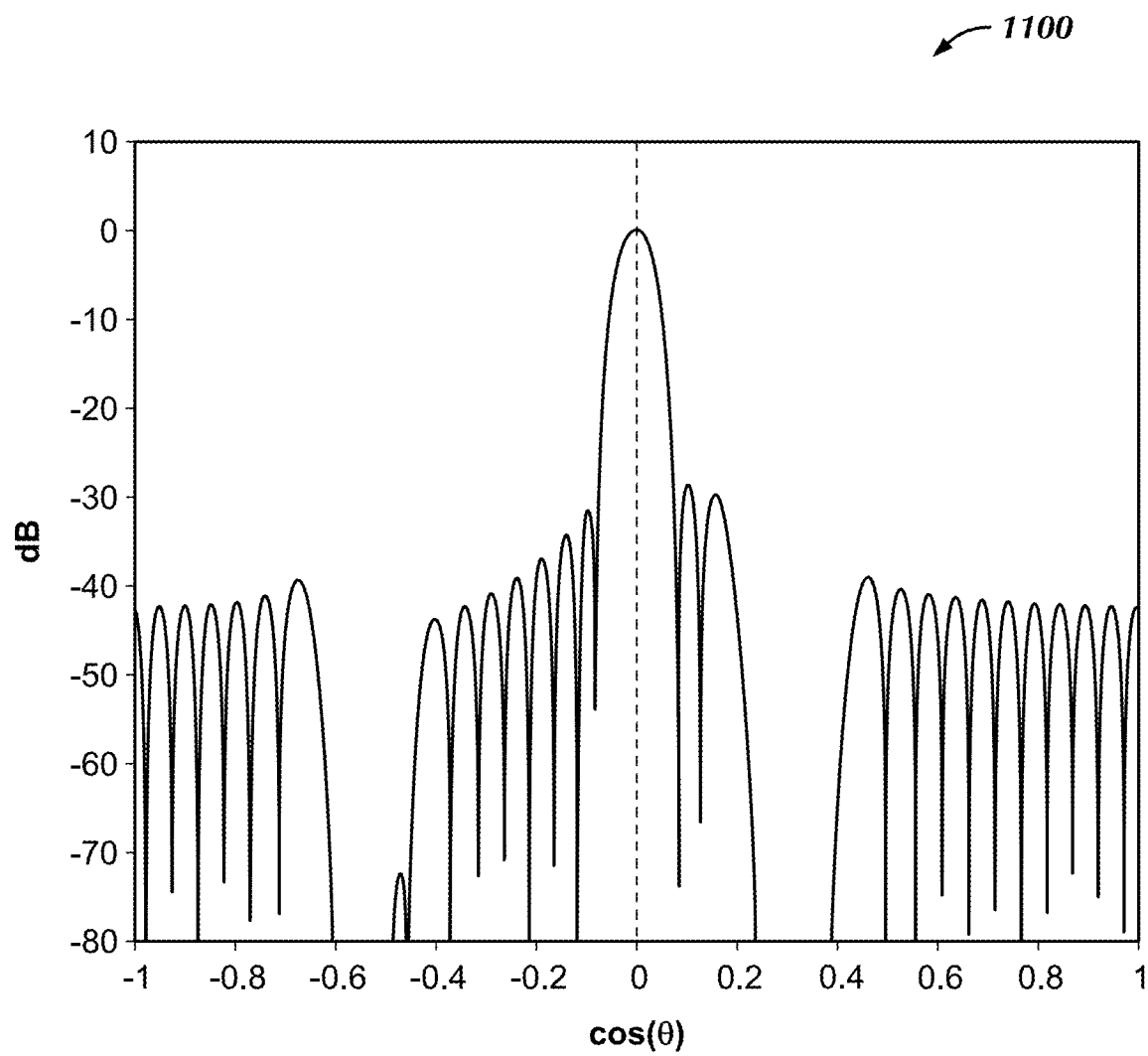
FIG. 11 illustrates two null regions for two Interference areas with the nulls stacked for two separate broad areas of rejection.

FIG. 11 illustrates two null regions 1100 for two Interference areas with the nulls stacked for two separate broad areas of rejection according to an embodiment of this disclosure. One Null region is centered around −0.5 on the X-axis, and the other Null region is centered around +0.3 on the X-axis.

Figure 12:
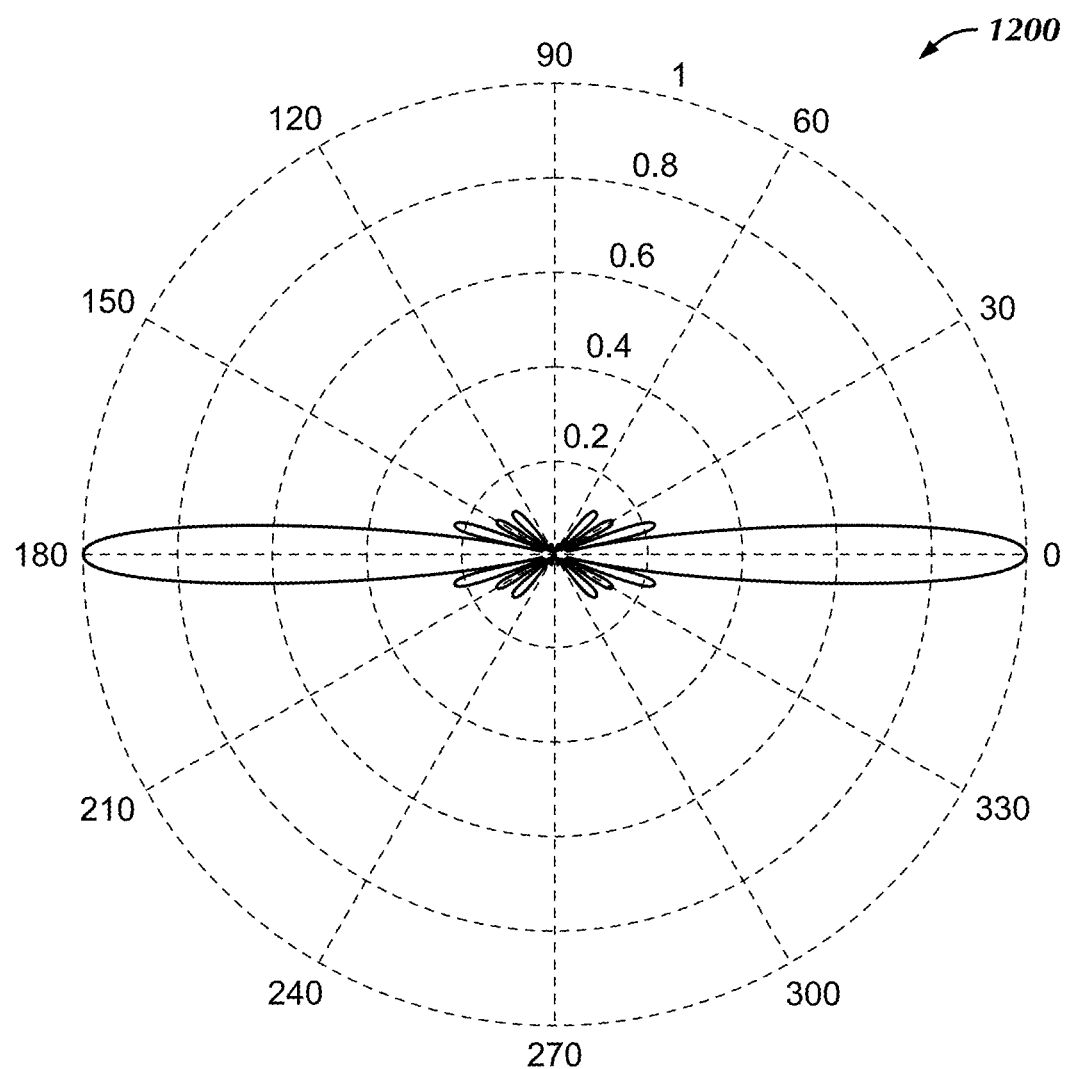
FIG. 12 illustrates narrowband beamforming at one decomposed frequency band with two interference cancelling nulls.

FIG. 12 illustrates narrowband beamforming 1200 at one decomposed frequency band with two interference cancelling nulls according to an embodiment of this disclosure that shows an example of steering a beam at 0 degrees while placing nulls at +60 degrees and −60 degrees in one narrowband beamformer.

Figure 13:
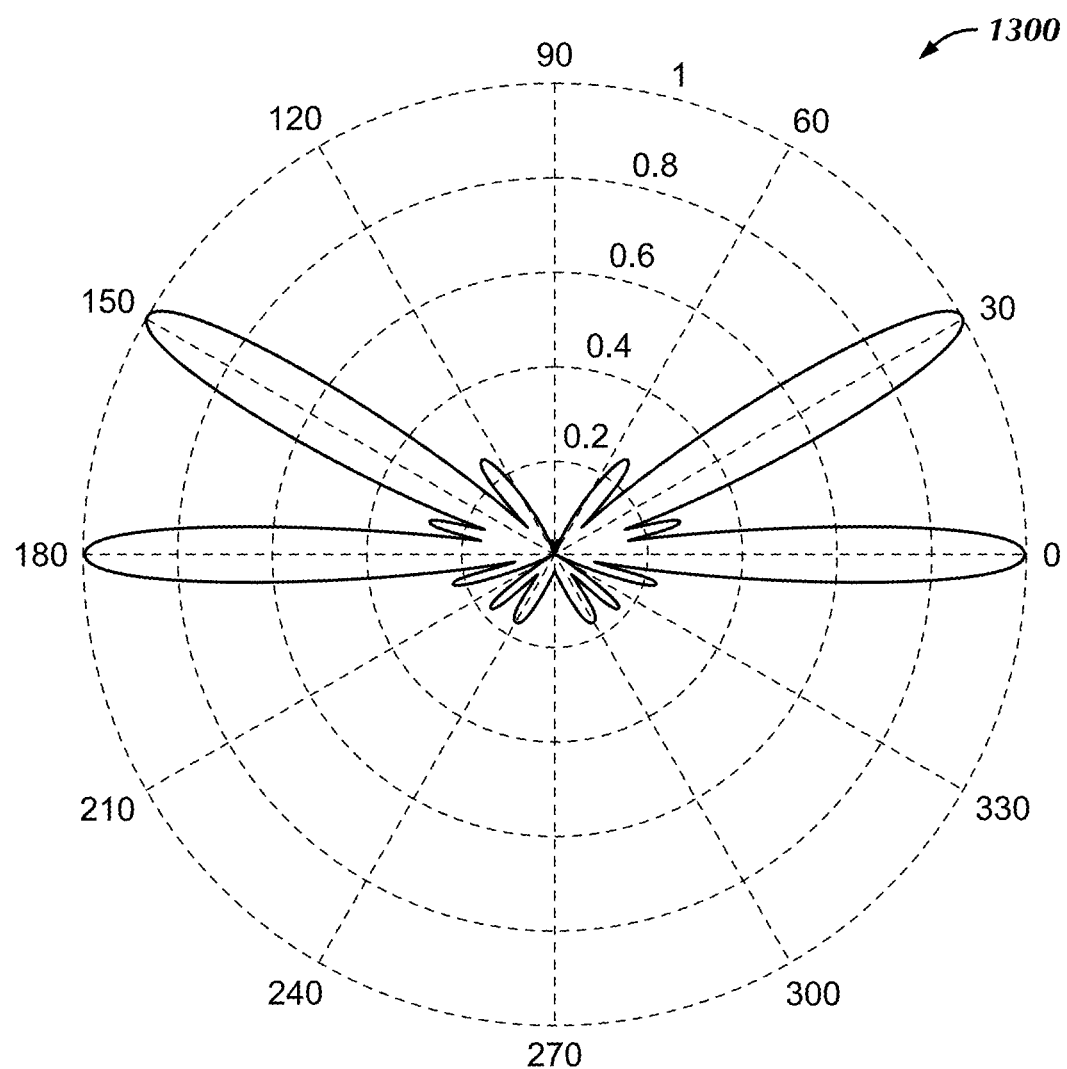
FIG. 13 illustrates narrowband beamforming at another decomposed frequency band with two separate interference cancelling nulls.

FIG. 13 illustrates narrowband beamforming 1300 at another decomposed frequency band with two separate interference cancelling nulls with steering beams at 0 degrees and 30 degrees while placing nulls at +75 degrees and −50 degrees in another narrowband beamformer according to an embodiment of this disclosure. It's important to note, the subarrays, subbands, or bins, need not share the spatial null, which is the point, and can be uniquely steered independent of one another. The subarrays, subbands, or bins need not share main lobe locations either but both main lobes and nulls can be common if required. Combinations of nulls or main lobe steering can be realized for a flexible, capable wideband beamformer. (Note: The graphs are read in the region from 0 degrees to +/−90 degrees and the remainder is a mirror image due to 1D array.)

The embodiments of this disclosure can be implemented with any type of physically realizable geometry that covers the desired wideband including linear, rectangular, circular, elliptical, hexagonal, spherical, conical, concentric elliptical or circular or hexagonal or conical, or nested, as described previously. This disclosure also applies to main lobe steering such that each frequency band, bin, subarray, or subband can uniquely focus in space to isolate in both frequency and space. This disclosure also applies to Direction-of-Arrival (DOA) signal detection, where a smaller resolution of DOA within a frequency band is desired.

Building on prior concepts, this disclosure and the disclosed embodiments show that each subband, frequency band, subarray, or narrowband frequency bin can exhibit its own unique spatial null within its own unique frequency band, thus enabling multiple independent unique nulls in space at different frequency bands across the wideband.

For example, in a real-world application, there may exist a noise emanating from a location that is 60 Hz or 120 Hz. A spatial null can be placed at the location using the narrowband beamforming technique described in this disclosure for that frequency band and the remaining wideband frequencies are still spatially collected by at least one of the beamformers. If another noise comes from a separate location at another frequency, say 8K Hz, then the narrowband beamformer for that frequency places a null there. Furthermore, each narrowband beamformer can place multiple nulls in space for its frequency band. This gives a large set of interference cancellation combinations across the wideband spectrum. One skilled in the art will appreciate that the beamformer algorithms can be preset or chosen by a user for the intended application and frequency response before running or using the embodiment.

Figure 15:
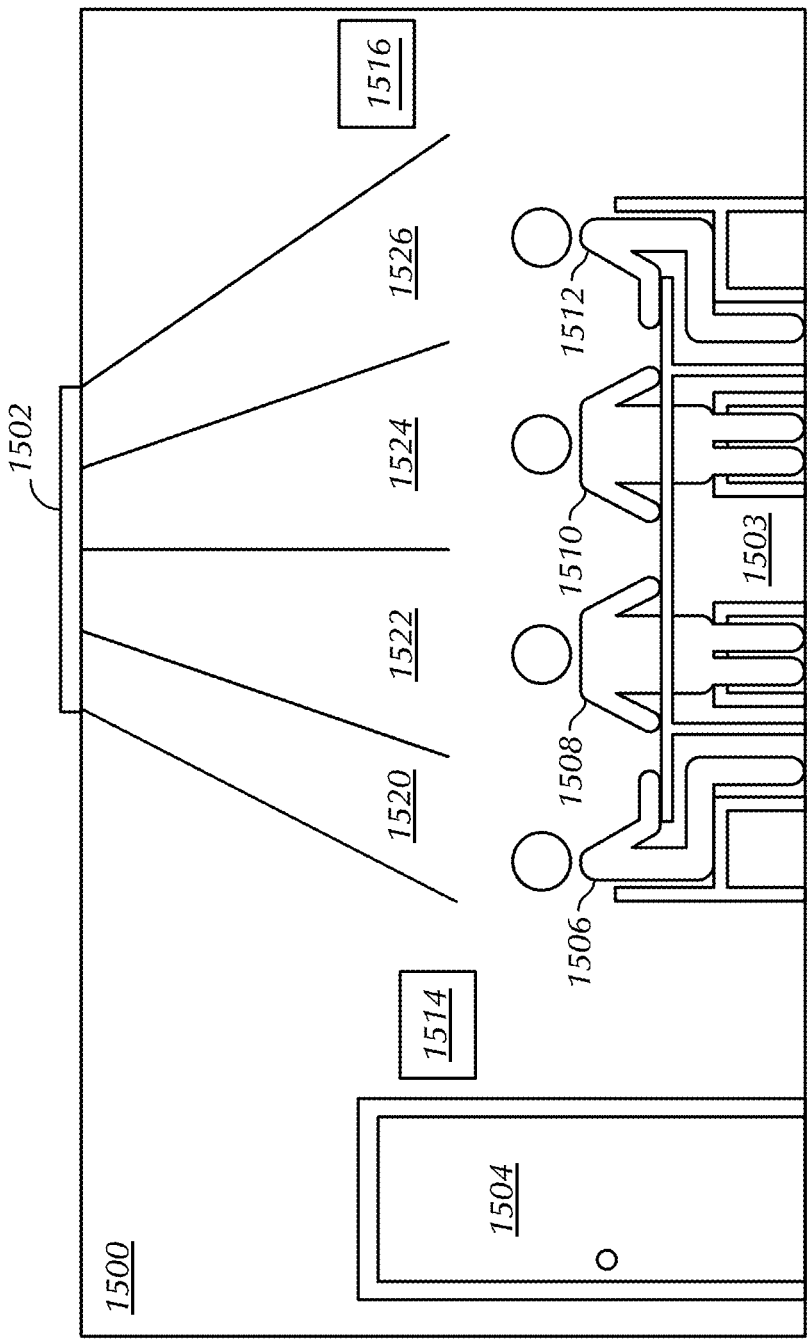
FIG. 15 discloses a microphone beamforming array embodiment of the disclosure used in conferencing environments.

FIG. 15 discloses a microphone beamforming array embodiment of the disclosure used in conferencing environments such as a conference room 1500 with door 1504. The microphone beamforming array 1502 is a ceiling tile microphone array or is a microphone array attached to a ceiling that generates beam patterns at 1520, 1522, 1524, 1526. The conference room environment has one or more users 1506, 1508, 1510, 1512 attending the conference centered around table 1503. The room 1500 has one or more noise generators 1514, 1516 that need to be removed from the signal before further transmission. The noise generators can include faulty electrical equipment, coffee maker, small refrigerator, or any other such device that creates a signal that can be considered noise to be removed from the output signal. The microphone beamforming array 1502 using the embodiments in this disclosure can generate and use null regions to cancel out the interference from noise generators 1514, 1516 or a dead zone such as door 1504 to produce an output signal that does not contain the noise or dead zone. One skilled in the art that the beamforming or other techniques for creating the null regions can be preset or chosen by a user for the intended application and frequency response before running or using the embodiment.

Figure 16:
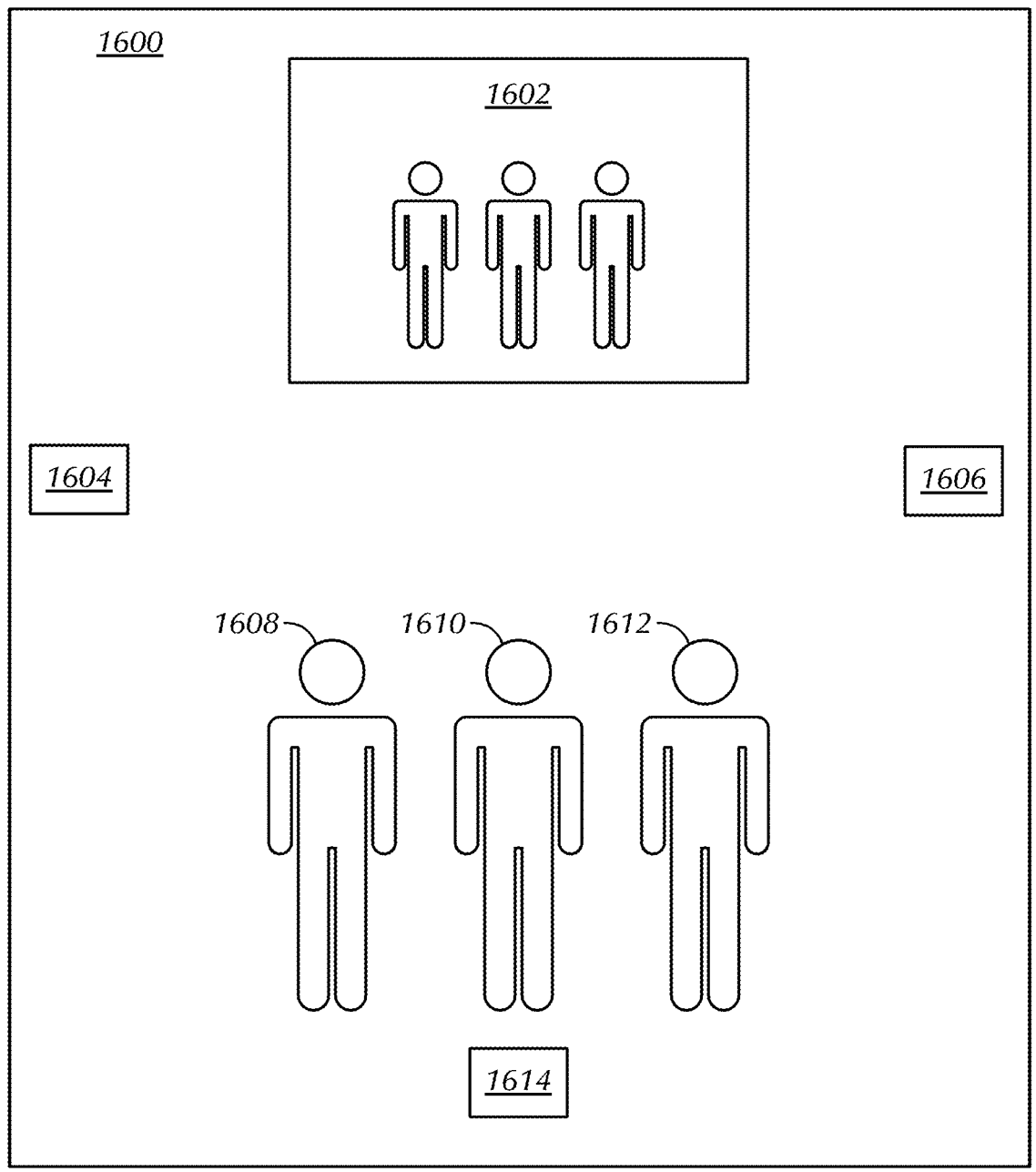
FIG. 16 discloses a conferencing embodiment of the disclosure used in an outdoor rock concert.

FIG. 16 discloses a conferencing embodiment according to this disclosure that occurs in an outdoor rock concert 1600. The stage with the band 1602 is of course playing music. The music emanates from speaker arrays 1604 and 1606. The users 1608, 1610, 1612 need to have a conference using conferencing device 1614. The conferencing device 1614 using an embodiment in this disclosure can use null regions to cancel out the interference from speaker arrays 1604, 1606 to produce an output signal that does not contain the noise. One skilled in the art that the beamforming or other techniques for creating the null regions can be preset or chosen by a user for the intended application and frequency response before running or using the embodiment.

Figure 17:
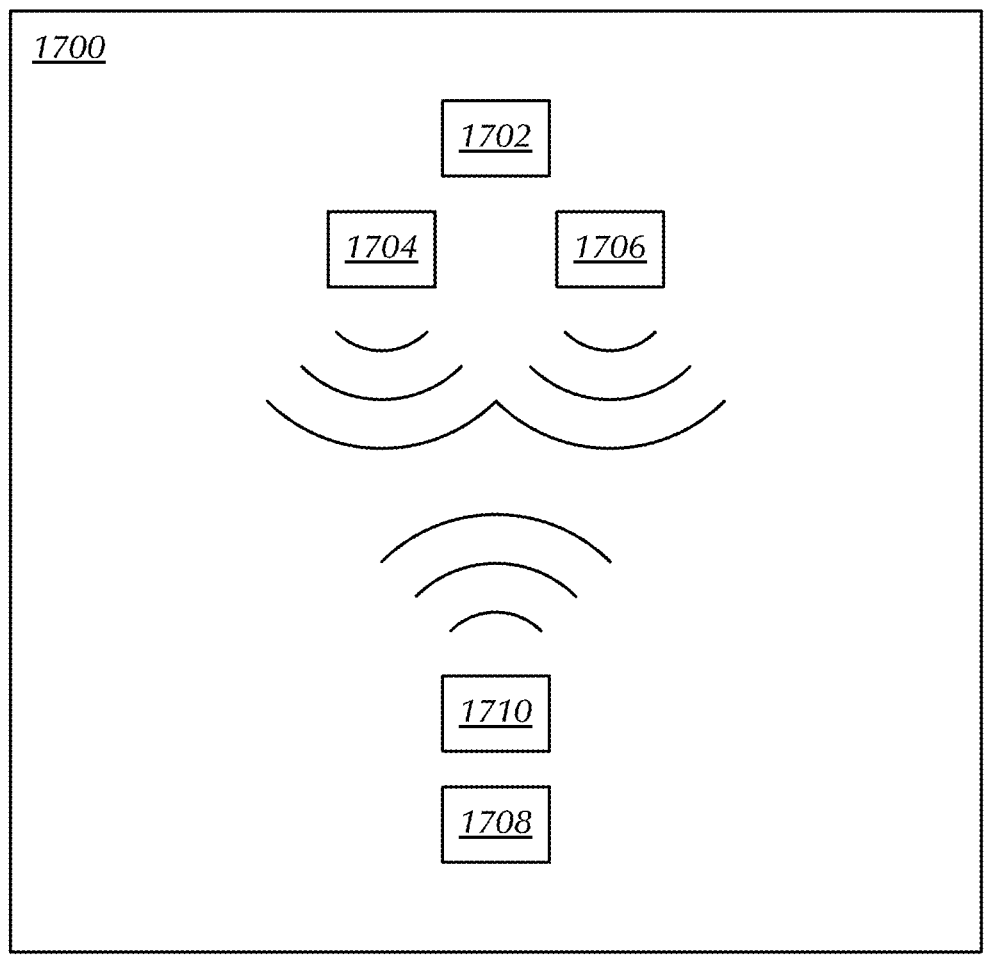
FIG. 17 discloses an embodiment of the disclosure used in a battlefield environment.

FIG. 17 discloses an embodiment according to this disclosure used in a battlefield environment. The battlefield environment 1700 features a friendly tank/combatant 1708 versus an enemy tank/combatant 1702. The enemy tank 1702 is surrounded by Global Positioning Satellite (GPS) jammers 1704, 1706 to prevent the friendly tank 1708 from being able to use GPS enabled weapons against it. The cancelling device 1710 using the embodiments in this disclosure can use null regions to cancel out the interference from the GPS jammers 1704, 1706 so that GPS enabled weapons can be used to destroy the enemy tank 1702. One skilled in the art that the beamforming or other techniques for creating the null regions can be preset or chosen by a user for the intended application and frequency response before running or using the embodiment.

Figure 14:
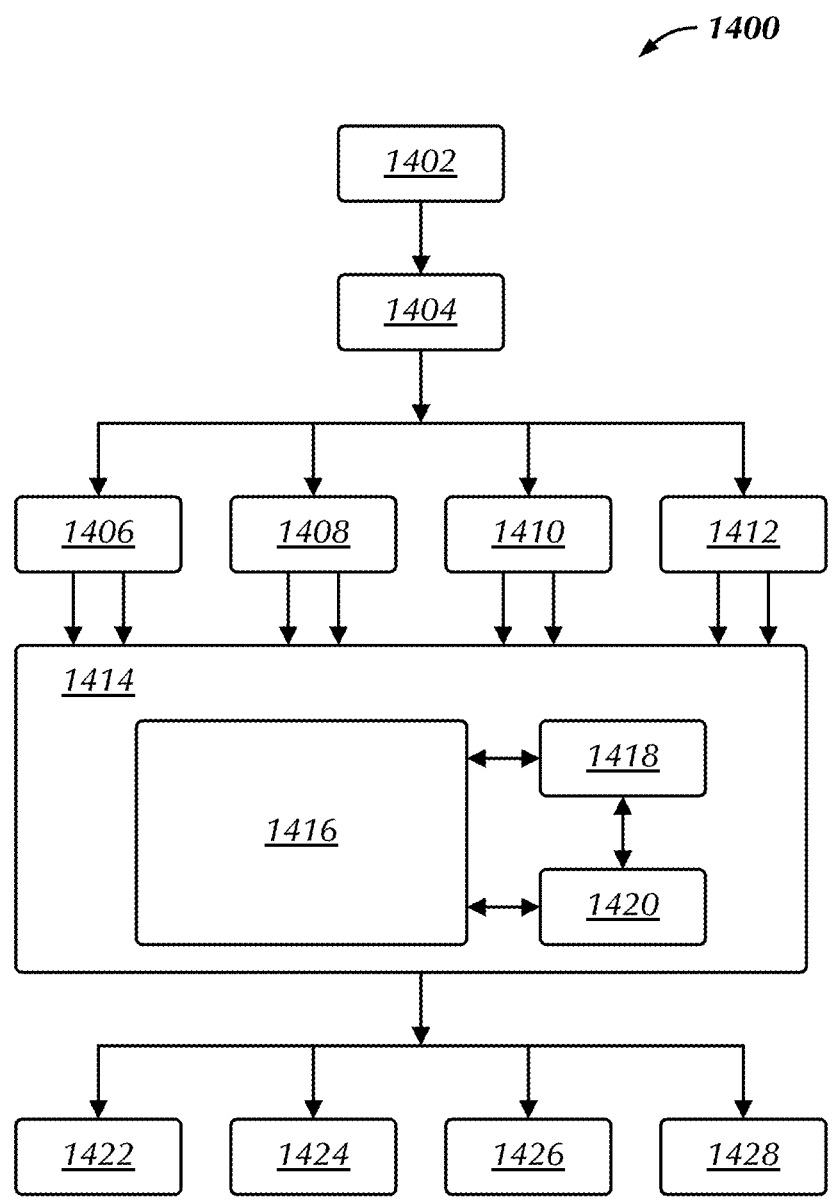
FIG. 14 illustrates multiple embodiments of this disclosure with a wide band array that uses wideband beamforming with interference cancellation at multiple independent frequencies and spatial locations.

FIG. 14 illustrates an overview of the different embodiments for a wide band array that uses wideband beamforming 1400. The sensors illustrated in this disclosure receive either a digital signal or analog signal which is converted to digital signal 1402. A wideband spectrum can be partitioned into smaller frequency bands using an analysis bank (filters) and sensors, frequency band filters and subarrays, sensors and frequency band filters, or sensors and transforming to the frequency domain using a Discrete Fourier Transform (DFT). The different frequency decomposition methods 1404 use different sensor techniques with various pattern synthesis: Sensors for Subarray 1406, Sensors and Frequency Band Filters 1408, Sensors and Analysis Bank 1410, Sensors and DFT 1412, for performing the incoming processing of the signals. Each sensor block (1406, 1408, 1410, 1412), provides its one through N output to the one through N narrowband beamformers 1414 for additional processing. A processor 1420 with memory and storage 1418 couple to the sensor block 1406, 1408, 1410, 1412. Memory and communication buses provide storage and lines for fetching and sending data and signals for beamforming. The processor executes the beamforming algorithms that combine sensors to form a directivity pattern with nulls or fetches pre-computed filters/weights for the sensors and applies the algorithms to the signals. For each decomposed frequency block, the narrowband algorithm is described as below. Other processing components 1416 include: Beamforming Algorithm within the Narrowband including window functions for beam pattern control; Pattern Synthesis for Beam pattern or gain response for the $N_{th}$ narrowband beamformer; Sensor spacing for beam pattern; Null Constraints for the $N_{th}$ frequency narrowband beamformer or bin; Define Null locations for the $N_{th}$ frequency narrowband beamformer or bin; Pattern Synthesis with Null Constraints for the $N_{th}$ frequency narrowband beamformer or bin; Method for Pattern Synthesis with Nulls for the $N_{th}$ frequency narrowband beamformer or bin; Processing components—Memory, Processors, Communication buses, Filters.

FIG. 14 further illustrates multiple embodiments 1400 of this disclosure with a wide band array that uses wideband beamforming with interference cancellation at multiple independent frequencies and spatial locations and main lobe steering at multiple independent frequencies and spatial locations. One embodiment uses one through N analysis filter bands 1410 coupled to one through N narrowband beamformers 1414 with the output processed through one through N synthesis bands and summed together to produce the full spectrum output signal 1426. Another embodiment uses one through M sensors with Discrete Fourier Transforms (DFT) and one through N frequency bins 1412 coupled to one through N narrowband beamformers 1414 processed through an Inverse DFT to produce the full spectrum output signal 1428. Another embodiment uses one through N sensor subarrays and one through N frequency bands 1406 coupled to one through N narrowband beamformers 1414 summed together to produce the full spectrum output signal 1422, where a subarray is a subset of sensors with intersensory spacing designed to support a frequency band. Another embodiment uses one through M sensor arrays with one through N frequency bands 1408 coupled to one through N narrowband beamformers 1414 summed together to produce the full spectrum output signal 1424.

Figure 3:
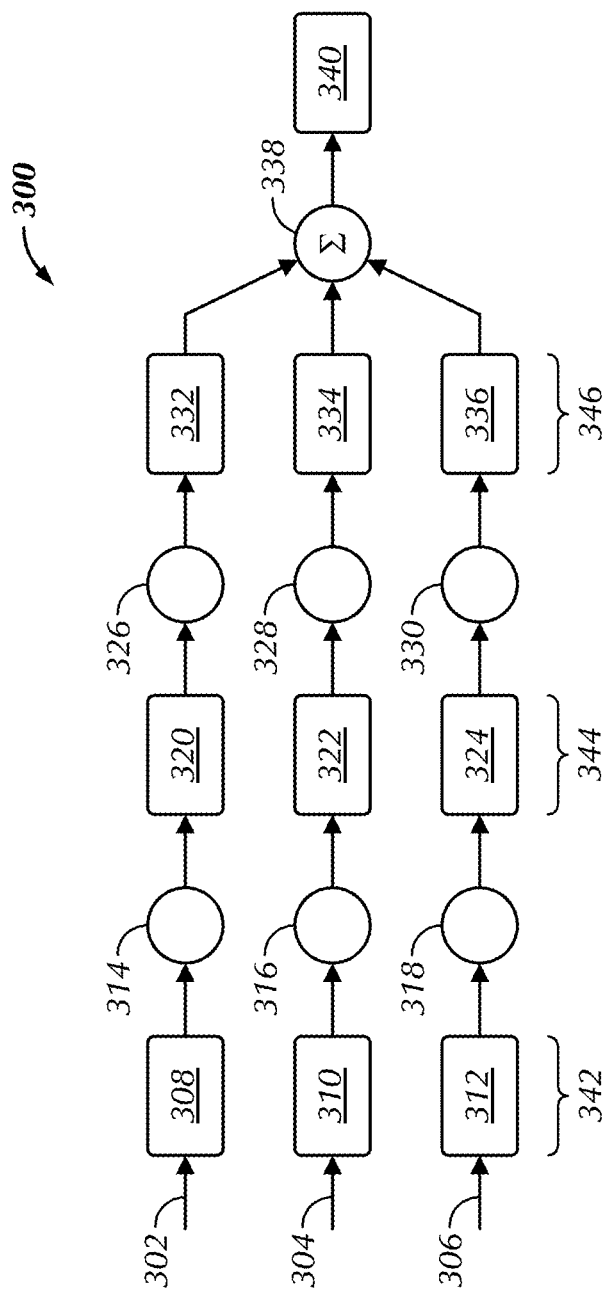
FIG. 3 illustrates analysis-synthesis filter banks for spectral decomposition and processing between banks.

FIG. 3 illustrates an embodiment 300 according to this disclosure for a wide band array that uses wideband beamforming with analysis-synthesis filter banks for spectral decomposition and processing between banks. Narrowband beamforming can be applied and used with subarrays (or sensors) and analysis-partitioned bands, depending on the width of the frequency band, either wide or narrow beamforming methods are available. (The strict definition of narrowband and wideband beamforming can vary depending on the design as one skilled in the art will appreciate. Subarray processing can span 1 KHz, 2 KHz, or 4 KHz, and some consider that to be wide while others call it narrow.) The goal is to partition the larger spectrum into segments for individual processing and control. With an analysis bank, the beamformed signals are recombined through a synthesis bank and summed. This is called Analysis-Synthesis bank and can use decimation (D) after the analysis bank and interpolation (I) just prior to the synthesis bank. The full spectrum result is the sum of the synthesis bank.

The wide band array receives wide band signals 302, 304, and 306. One skilled in the art will appreciate that these wide band signals are typically from the same source. The wide band signals are processed through the analysis bank 342, the narrowband beamforming bank 344, and the synthesis bank 346, before being combined 340 as the full output signal. One skilled in the art will appreciate that the performance of the analysis bank 342, the narrowband beamforming bank 344, and the synthesis bank 346 can be preset or chosen by a user for the intended application and frequency response before running or using the embodiment.

The first analysis filter band 308 receives wide band signal 302. The first analysis filter band 308 further includes: one or more sensors where each sensor is configured to sense signals, where the first analysis filter band 308 processes the signals in its designed frequency band. After processing by the first analysis filter band 308, the signal 302 is further processed by a first decimation 314. Decimation is the process of reducing the sampling rate by an integer factor D, where the signal first passes through an anti-aliasing filter, the analysis filter, and is then downsampled to a rate of 1/D the original rate. A decimation rate of 1 means the original sampling rate is preserved. The processed signal is further processed by a first narrowband beamformer 320. The first narrowband beamformer 320 generates a steerable main lobe and at least one null region placed at spatial locations in its frequency band. The processed and beamformed signal is processed with a first interpolation 326. After interpolation, which upsamples the signal to restore the sampling rate, the processed signal is further processed by a first synthesis filter band 332.

The second analysis filter band 310 receives wide band signal 304. The second analysis filter band 310 further includes: one or more sensors where each sensor is configured to sense signals, where the second analysis filter band 310 processes the signals in its designed frequency band. After processing by the second analysis filter band 310, the signal 304 is further processed by a second decimation 316. The processed signal is further processed by a second narrowband beamformer 322. The second narrowband beamformer 322 generates a steerable main lobe and at least one null region placed at spatial locations in its frequency band. The processed and beamformed signal is processed with a second interpolation 328. After interpolation, the processed signal is further processed by a second synthesis filter band 334.

The $N_{th}$ analysis filter band 312 receives wide band signal 306. The $N_{th}$ analysis filter band 312 further includes: one or more sensors where each sensor is configured to sense signals, where the $N_{th}$ analysis filter band 312 processes the signals in its designed frequency band. After processing by the $N_{th}$ analysis filter band 312, the signal 306 is further processed by an $N_{th}$ decimation 318. The processed signal is further processed by an $N_{th}$ narrowband beamformer 324. The $N_{th}$ narrowband beamformer 324 generates a steerable main lobe and at least one null region placed at spatial locations in its frequency band. The processed and beamformed signal is processed with an $N_{th}$ interpolation 330. After interpolation, the processed signal is further processed by an $N_{th}$ synthesis filter band 336.

The signal output from each of the first synthesis filter band 332, the second synthesis filter band 334, and the $N_{th}$ synthesis filter band 336 are summed 338 together to produce the full spectrum output signal 340.

Figure 5:
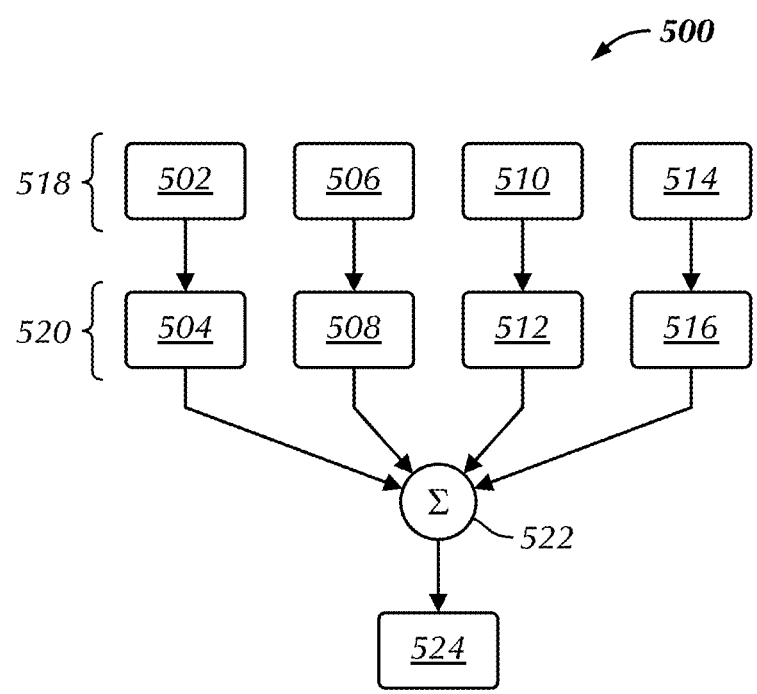
FIG. 5 illustrates wideband beamforming using decomposition into subarrays.

FIG. 5 illustrates wideband beamforming 500 using frequency decomposition 518 into beamformed subarrays 520. By using frequency subarray decomposition 518 to cover a large spectrum, the beamforming of the directivity pattern for each subarray frequency band 520 can be uniquely designed and controlled, independent of other subarray frequency bands. That gives degrees of freedom that would otherwise not exist for a broad band directivity, and thus individual steering per frequency band. The total wideband result is the sum of the individual beamformers. One skilled in the art will appreciate that frequency subarray decomposition and the beamforming of the directivity pattern can be preset or chosen by a user for the intended application and frequency response before running or using the embodiment.

The wide band array receives wide band signals into frequency decomposition bank 518. One skilled in the art will appreciate that these wide band signals are typically from the same source. The wide band signals are processed through frequency decomposition bank 518, which includes N filter bands for each of N subarrays, 520 represents each beamforming algorithm for each $N_{th}$ subarray, before being combined 522 as the full output signal. One skilled in the art will appreciate that the performance of frequency decomposition bank 518, and subarrays 520 can be preset or chosen by a user for the intended application and frequency response before running or using the embodiment.

A first sensor subarray 502 is configured to sense signals from a first $M_1$ set of sensors to support the first frequency band $[f_1, f_2]$. A second sensor subarray 506 is configured to sense signals from a second $M_2$ set of to support a second frequency band $[f_2, f_3]$. A third sensor subarray 510 is configured to sense signals from a third $M_3$ set of sensors to support a third frequency band $[f_3, f_4]$. An $N_{th}$ sensor subarray 514 is configured to sense signals from a $M_n^{th}$ set of sensors to support an $N_{th}$ frequency band $[f_N, f_{edge}]$.

A first beamformer 504 that processes the signals of the first frequency band, the first beamformer 504 generates a steerable main lobe and at least one null region placed at spatial locations in the first frequency band. A second beamformer 508 that processes the signals of the second frequency band, the second beamformer 508 generates a steerable main lobe and at least one null region placed at spatial locations in the second frequency band. A third beamformer 512 that processes the signals of the third frequency band, the third beamformer 512 generates a steerable main lobe and at least one null region placed at spatial locations in the third frequency band. An $N_{th}$ beamformer 516 that processes the signals of the $N_{th}$ frequency band, the $N_{th}$ beamformer 516 generates a steerable main lobe and at least one null region placed at spatial locations in the $N_{th}$ frequency band.

The output signals in 520 are summed 522 to produce the full spectrum output signal 524.

Figure 6:
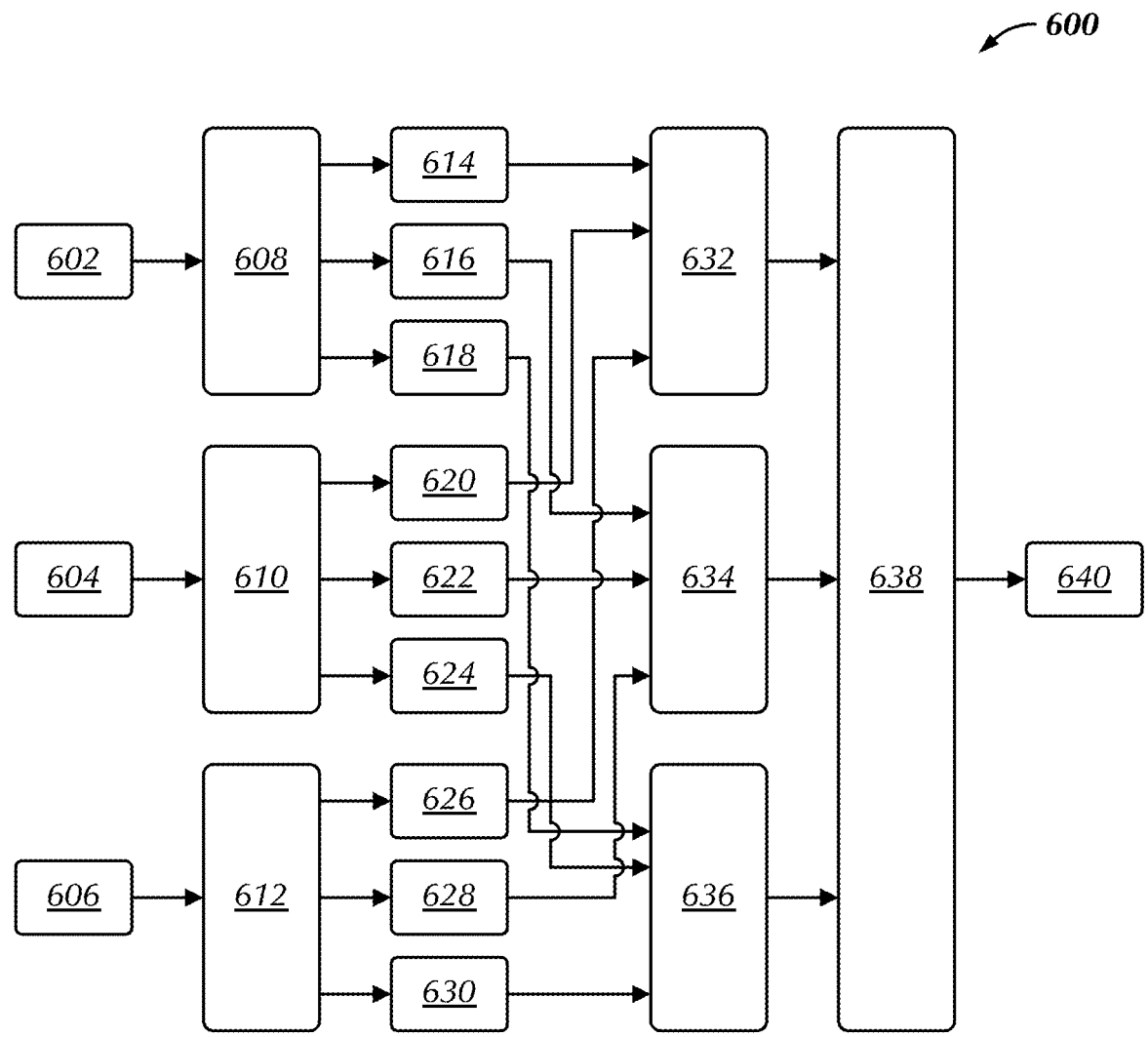
FIG. 6 illustrates wideband beamforming using DFT decomposition.

FIG. 6 illustrates an embodiment 600 according to this disclosure for a wide band array that uses wideband beamforming with a Discrete Fourier Transform (DFT) decomposition. For a broadband frequency domain beamformer, a block of time data samples is input to a DFT which decomposes the signal into frequency bins and applies narrowband beamforming at each of the frequency bins. Recombination is through an Inverse Discrete Fourier Transform (IDFT). An alternative embodiment uses a subarray output that can be divided into DFT frequency bins. Recombination is first by an IDFT per subarray then summation of the subarrays.

Discrete Fourier Transform decomposition collects samples in the time-domain, where sampling is at the Nyquist rate, and a DFT (or Fast Fourier Transform) operation outputs frequency components of the signal. Each sensor is sampled, buffered, and a DFT operation completed. Common frequency bin outputs are assembled for beamforming. This allows isolated beamformers per frequency bin with unique design and control. After beamforming, an Inverse Discrete Fourier Transform (IDFT) is performed to yield the full wideband output. There are M sensors and N frequency bins that correspond to N beamformers. One skilled in the art will appreciate that the performance of the sensors, the weights, and variables of the DFT, the frequency response of the frequency bins, the narrowband beamformers, and the weights and variables of the IDFT can be preset or chosen by a user for the intended application and frequency response before running or using the embodiment.

A first sensor 602 is configured to sense signals into a first buffer, a first Discrete Fourier Transform (DFT) 608 decomposes the signals from the first buffer into a first frequency bin 614, a second frequency bin 616, and an $N_{th}$ frequency bin 618 of the first DFT 608. A second sensor 604 is configured to sense signals into a second buffer, a second DFT 610 decomposes the signals from the second buffer into a first frequency bin 620, a second frequency bin 622, and an $N_{th}$ frequency bin 624 of the second DFT 610. An $M_{th}$ sensor 606 is configured to sense signals into an Mth buffer, an $M_{th}$ DFT 612 decomposes the signals from the $M_{th}$ buffer into a first frequency bin 626, a second frequency bin 628, and an $N_{th}$ frequency bin 630 of the $M_{th}$ DFT 612.

A first narrowband beamformer 632 that processes the signals of the first frequency bin 614, 620, 626 from the first DFT 608, the second DFT 610, and the $M_{th}$ DFT 612, the first narrowband beamformer 632 generates a steerable main lobe and at least one null region steerable in spatial locations in the first frequency bin 614, 620, 626. A second narrowband beamformer 634 that processes the signals of the second frequency bin 616, 622, 628 from the first DFT 608, the second DFT 610, and the $M_{th}$ DFT 612, the second narrowband beamformer generates a steerable main lobe and at least one null region placed at spatial locations in the second frequency bin 616, 622, 628. An $N_{th}$ narrowband beamformer 636 that processes the decomposed signals of the $N_{th}$ frequency bin 618, 624, 630 from the first DFT 608, the second DFT 610, and the $M_{th}$ DFT 612, the $N_{th}$ narrowband beamformer generates a steerable main lobe and at least one null region placed at spatial locations in the $N_{th}$ frequency bin 618, 624, 630.

The signal output from each of the first beamformer 632, the second beamformer 634, and the $N_{th}$ beamformer 636 are processed through an Inverse Discrete Fourier Transform (IDFT) 638 to produce the full spectrum output signal 640.

Figure 18:
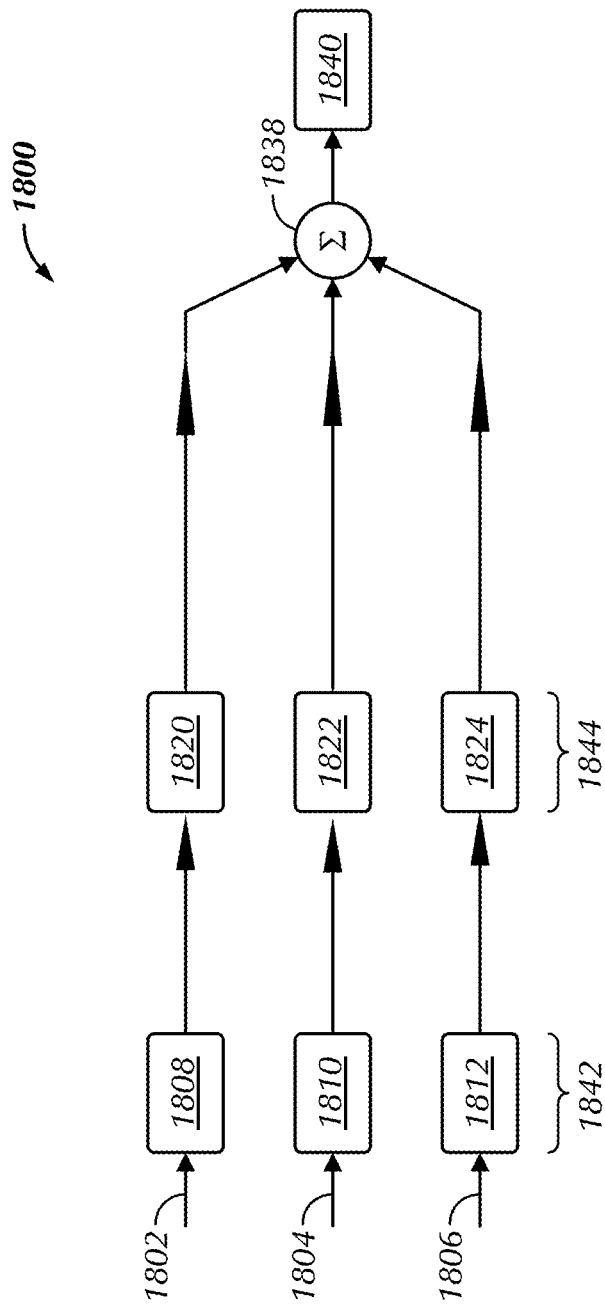
FIG. 18 illustrates an embodiment of the disclosure that uses frequency bands, bandpass filters, and narrowband beamforming.

FIG. 18 illustrates an embodiment 1800 according to this disclosure for a wide band array that uses wideband beamforming with main lobe steering and interference cancellation at multiple independent frequencies and spatial locations. This embodiment uses one through N sensor subarrays and one through N frequency bands 1842 coupled to one through N narrowband beamformers 1844 summed together to produce the full spectrum output signal, where a subarray is a subset of sensors with intersensory spacing designed to support a frequency band.

A first frequency band 1802 that includes one or more sensors (not shown) where each sensor is configured to sense signals, a first bandpass filter 1808 passes signals from the sensors in the first frequency band 1802, the processed signals are further processed by a first narrowband beamformer 1820 dedicated to the first frequency band 1802, the first narrowband beamformer 1820 generates a steerable main lobe and at least one null region placed at spatial locations in the first frequency band 1802.

A second frequency band 1804 that includes one or more sensors (not shown) where each sensor is configured to sense signals, the second bandpass filter 1810 passes signals in the second frequency band 1804, the processed signals are further processed by a second narrowband beamformer 1822 dedicated to the second frequency band 1804, the second narrowband beamformer 1822 generates a steerable main lobe and at least one null region placed at spatial locations in the second frequency band 1804.

An $N_{th}$ frequency band 1806 that includes one or more sensors (not shown) where each sensor is configured to sense signals, the $N_{th}$ bandpass filter 1812 passes signals in the $N_{th}$ frequency band 1806, the processed signals are further processed by an $N_{th}$ narrowband beamformer 1824 dedicated to the $N_{th}$ frequency band 1806, the Nth narrowband beamformer 1824 generates a steerable main lobe and at least one null region placed at spatial locations in the $N_{th}$ frequency band 1806.

The signal output from each of the first narrowband beamformer 1820, the second narrowband beamformer 1822, and the $N_{th}$ narrowband beamformer 1824 are summed 1838 together to produce the full spectrum output signal 1840.

While the present disclosure has been described in this disclosure regarding certain illustrated and described embodiments, those of ordinary skill in the art will recognize and appreciate that the present disclosure is not so limited. Rather, many additions, deletions, and modifications to the illustrated and described embodiments may be made without departing from the true scope of the invention, its spirit, or its essential characteristics as claimed along with their legal equivalents. In addition, features from one embodiment may be combined with features of another embodiment while still being encompassed within the scope of the invention as contemplated by the inventor. The described embodiments are to be considered only as illustrative and not restrictive. All changes which come within the meaning and range of equivalency of the claims are to be embraced within their scope. Disclosing the present invention is exemplary only, with the true scope of the present invention being determined by the included claims.

The invention claimed is:

1. A wide band array that uses wideband beamforming with interference cancellation at multiple independent frequencies and spatial locations, comprising:
a first $M_1$ set of acoustic sensors forms the first subarray and is physically configured to sense a first set of acoustic signals for a first frequency band [$f_1$, $f_2$] by upholding the spatial Nyquist sampling distances between the first set of acoustic sensors, a first filter bandpasses the first set of acoustic signals in the first frequency band from the first subarray;
a second $M_2$ set of acoustic sensors forms the second subarray and is physically configured to sense a second set of acoustic signals for a second frequency band [$f_2$, $f_3$] by upholding the spatial Nyquist sampling distances between the second set of acoustic sensors, a second filter bandpasses the second set of acoustic signals in the second frequency band from the second subarray;
an $M_n^{th}$ set of acoustic sensors forms the $N_{th}$ subarray and is physically configured to sense an $M_n^{th}$ set of acoustic signals for an $N_{th}$ frequency band [$f_N$, $f_{edge}$] by upholding the spatial Nyquist sampling distances between the $M_n^{th}$ set of acoustic sensors, an $N_{th}$ filter bandpasses the $M_n^{th}$ set of acoustic signals in the $N_{th}$ frequency band from the $N_{th}$ subarray;
a first beamformer that processes the first set of acoustic signals of the first frequency band, the first beamformer generates a steerable main lobe and at least one null region placed at spatial locations in the first frequency band;
a second beamformer that processes the second set of acoustic signals of the second frequency band, the second beamformer generates a steerable main lobe and at least one null region placed at spatial locations in the second frequency band;
an $N_{th}$ beamformer that processes the $M_n^{th}$ set of acoustic signals of the $N_{th}$ frequency band, the $N_{th}$ beamformer generates a steerable main lobe and at least one null region placed at spatial locations in the $N_{th}$ frequency band;
the signal output from each of the first subarray's beamformer, the second subarray's beamformer, and the $N_{th}$ subarray's beamformer are summed to produce the full wideband spectrum output signal.

2. A method to make a wide band array that uses wideband beamforming with interference cancellation at multiple independent frequencies and spatial locations, comprising:
providing a first $M_1$ set of acoustic sensors forms the first subarray and is physically configured to sense a first set of acoustic signals for a first frequency band [$f_1$, $f_2$] by upholding the spatial Nyquist sampling distances between the first set of acoustic sensors, a first filter bandpasses the first set of acoustic signals in the first frequency band from the first subarray;
providing a second $M_2$ set of acoustic sensors forms the second subarray and is physically configured to sense a second set of acoustic signals for a second frequency band [$f_2$, $f_3$] by upholding the spatial Nyquist sampling distances between the second set of acoustic sensors, a second filter bandpasses the second set of acoustic signals in the second frequency band from the second subarray;
providing an $M_n^{th}$ set of acoustic sensors forms the $N_{th}$ subarray and is physically configured to sense an $M_n^{th}$ set of acoustic signals for an $N_{th}$ frequency band [$f_N$, $f_{edge}$] by upholding the spatial Nyquist sampling distances between the $M_n^{th}$ set of acoustic sensors, an $N_{th}$ filter bandpasses the $M_n^{th}$ set of acoustic signals in the $N_{th}$ frequency band from the $N_{th}$ subarray;
providing a first beamformer that processes the first set of acoustic signals of the first frequency band, the first beamformer generates a steerable main lobe and at least one null region placed at spatial locations in the first frequency band;
providing a second beamformer that processes the second set of acoustic signals of the second frequency band, the second beamformer generates a steerable main lobe and at least one null region placed at spatial locations in the second frequency band;
providing an $N_{th}$ beamformer that processes the $M_n^{th}$ set of acoustic signals of the $N_{th}$ frequency band, the $N_{th}$ beamformer generates a steerable main lobe and at least one null region placed at spatial locations in the $N_{th}$ frequency band;
providing the full wideband spectrum output signal summed together from the signal output from each of the first subarray's beamformer, the second subarray's beamformer, and the $N_{th}$ subarray's beamformer.

3. A method to use a wide band array that uses wideband beamforming with interference cancellation at multiple independent frequencies and spatial locations, comprising:
sensing with a first $M_1$ set of acoustic sensors forms the first subarray and is physically configured to sense a first set of acoustic signals for a first frequency band $[f_1, f_2]$ by upholding the spatial Nyquist sampling distances between the first set of acoustic sensors, a first filter bandpasses the first set of acoustic signals in the first frequency band from the first subarray;
sensing with second $M_2$ set of acoustic sensors forms the second subarray and is physically configured to sense a second set of acoustic signals for a second frequency band $[f_2, f_3]$ by upholding the spatial Nyquist sampling distances between the second set of acoustic sensors, a second filter bandpasses the second set of acoustic signals in the second frequency band from the second subarray;
sensing with an Math set of acoustic sensors forms the $N_{th}$ subarray and is physically configured to sense an $M_n^{th}$ of acoustic signals for an $N_{th}$ frequency band $[f_N, f_{edge}]$ by upholding the spatial Nyquist sampling distances between the $M_n^{th}$ set of acoustic sensors, an $N_{th}$ filter bandpasses the $M_n^{th}$ set of acoustic signals in the $N_{th}$ frequency band from the $N_{th}$ subarray;
processing with a first beamformer that processes the first set of acoustic signals of the first frequency band, the first beamformer generates a steerable main lobe and at least one null region placed at spatial locations in the first frequency band;
processing with a second beamformer that processes the second set of acoustic signals of the second frequency band, the second beamformer generates a steerable main lobe and at least one null region placed at spatial locations in the second frequency band;
processing with an $N_{th}$ beamformer that processes the $M_n^{th}$ set of acoustic signals of the $N_{th}$ frequency band, the $N_{th}$ beamformer generates a steerable main lobe and at least one null region placed at spatial locations in the $N_{th}$ frequency band;
summing the signal output from each of the first subarray s beamformer, the second subarray's beamformer, and the $N_{th}$ subarray's beamformer to produce the full wideband spectrum output signal.

4. A non-transitory program storage device readable by a computing device that tangibly embodies a program of instructions executable by the computing device to perform a method to use a wide band array that uses wideband beamforming with interference cancellation at multiple independent frequencies and spatial locations, comprising:
sensing with a first $M_1$ set of acoustic sensors forms the first subarray and is physically configured to sense a first set of acoustic signals for a first frequency band $[f_1, f_2]$ by upholding the spatial Nyquist sampling distances between the first set of acoustic sensors, a first filter bandpasses the first set of acoustic signals in the first frequency band from the first subarray;
sensing with second $M_2$ set of acoustic sensors forms the second subarray and is physically configured to sense a second set of acoustic signals for a second frequency band $[f_2, f_3]$ by upholding the spatial Nyquist sampling distances between the second set of acoustic sensors, a second filter bandpasses the second set of acoustic signals in the second frequency band from the second subarray;
sensing with an $M_n^{th}$ set of acoustic sensors forms the $N_{th}$ subarray and is physically configured to sense an $M_n^{th}$ set of acoustic signals for an $N_{th}$ frequency band $[f_N, f_{edge}]$ by upholding the spatial Nyquist sampling distances between the $M_n^{th}$ set of acoustic sensors, an $N_{th}$ filter bandpasses the $M_n^{th}$ set of acoustic signals in the $N_{th}$ frequency band from the $N_{th}$ subarray;
processing with a first beamformer that processes the first set of acoustic signals of the first frequency band, the first beamformer generates a steerable main lobe and at least one null region placed at spatial locations in the first frequency band;
processing with a second beamformer that processes the second set of acoustic signals of the second frequency band, the second beamformer generates a steerable main lobe and at least one null region placed at spatial locations in the second frequency band;
processing with an $N_{th}$ beamformer that processes the $M_n^{th}$ set of acoustic signals of the $N_{th}$ frequency band, the $N_{th}$ beamformer generates a steerable main lobe and at least one null region placed at spatial locations in the $N_{th}$ frequency band;
summing the signal output from each of the first subarray's beamformer, the second subarray's beamformer, and the $N_{th}$ subarray's beamformer to produce the full wideband spectrum output signal.

5. A wide band array that uses wideband beamforming with interference cancellation at multiple independent frequencies and spatial locations, comprising:
a first $M_1$ set of acoustic sensors forms the first subarray and is physically configured to sense a first set of acoustic signals for a first frequency band $[f_1, f_2]$ by upholding the spatial Nyquist sampling distances between the first set of acoustic sensors, a first filter means bandpasses the first set of acoustic signals in the first frequency band from the first subarray;
a second $M_2$ set of acoustic sensors forms the second subarray and is physically configured to sense a second set of acoustic signals for a second frequency band $[f_2, f_3]$ by upholding the spatial Nyquist sampling distances between the second set of acoustic sensors, a second filter means bandpasses the second set of acoustic signals in the second frequency band from the second subarray;
an $M_n^{th}$ set of acoustic sensors forms the $N_{th}$ subarray and is physically configured to sense an $M_n^{th}$ set of acoustic signals for an $N_{th}$ frequency band $[f_N, f_{edge}]$ by upholding the spatial Nyquist sampling distances between the $M_n^{th}$ set of acoustic sensors, an $N_{th}$ filter means bandpasses the $M_n^{th}$ set of acoustic signals in the $N_{th}$ frequency band from the $N_{th}$ subarray;
a first beamformer that processes the first set of acoustic signals of the first frequency band, the first beamformer generates a steerable main lobe and at least one null region placed at spatial locations in the first frequency band;
a second beamformer that processes the second set of acoustic signals of the second frequency band, the second beamformer generates a steerable main lobe and at least one null region placed at spatial locations in the second frequency band;
an $N_{th}$ beamformer that processes the $M_n^{th}$ set of acoustic signals of the $N_{th}$ frequency band, the $N_{th}$ beamformer generates a steerable main lobe and at least one null region placed at spatial locations in the $N_{th}$ frequency band;
the signal output from each of the first subarray's beamformer, at the second subarray's beamformer, and the $N_{th}$ subarray's beamformer are summed to produce the full wideband spectrum output signal.

\* \* \* \* \*